US011107159B2

(12) United States Patent
Hails et al.

(10) Patent No.: US 11,107,159 B2
(45) Date of Patent: Aug. 31, 2021

(54) SYSTEM FOR AUTOMATED ORIGINATION OF CAPITAL CLIENT ENGAGEMENT BASED ON DEFAULT PROBABILITY DERIVED FROM POINT-OF-SALE DATA

(71) Applicant: Toast, Inc., Boston, MA (US)

(72) Inventors: Alexander H. Hails, Brookline, MA (US); Clement Masson, Brookline, MA (US); Benjamin Gordon, Scituate, MA (US)

(73) Assignee: Toast, Inc., Boston, MA (US)

( * ) Notice: Subject to any disclaimer, the term of this patent is extended or adjusted under 35 U.S.C. 154(b) by 0 days.

(21) Appl. No.: 16/406,503

(22) Filed: May 8, 2019

(65) Prior Publication Data

US 2020/0357056 A1      Nov. 12, 2020

(51) Int. Cl.
*G06Q 40/02*      (2012.01)
*G06Q 20/20*      (2012.01)
*G06Q 30/02*      (2012.01)

(52) U.S. Cl.
CPC .......... *G06Q 40/025* (2013.01); *G06Q 20/20* (2013.01); *G06Q 30/0202* (2013.01)

(58) Field of Classification Search
CPC ... G06Q 40/025; G06Q 20/20; G06Q 30/0202
See application file for complete search history.

(56) References Cited

U.S. PATENT DOCUMENTS 7,263,496 B1   8/2007   Weigelt et al.
7,761,324 B2   7/2010   Amerasinghe et al.
(Continued)

FOREIGN PATENT DOCUMENTS

CN      107644375 A      1/2018
JP      2000259719 A     9/2000
(Continued)

OTHER PUBLICATIONS

Rao, Qian et al. "Loan Pricing Model for SMEs Based on Credit Risk Adjustment." *2011 International Conference on Machine Learning and Cybernetics*, Guilin, Jul. 10-13, 2011. pp. 489-493.
(Continued)

*Primary Examiner* — Scott C Anderson
(74) *Attorney, Agent, or Firm* — Richard K. Huffman; Huffman Patent Group, LLC

(57) ABSTRACT

A system for automated origination of capital client engagement is provided. The system includes a rate processor, a revenue forecaster, and an offer processor. The rate processor is configured to perform a binary logistic regression on subscriber data and metrics derived from historical POS data corresponding to subscribers of a point-of-sale (POS) subscription service to generate logistic regression coefficients that are used to calculate probability of default (PD) values for each of the subscribers, and configured to employ new subscriber data and metrics to generate updated PD values for the each of the subscribers. The revenue forecaster is coupled to the rate processor and is configured to employ the historical POS data to predict future POS data for establishments corresponding to the each of the subscribers, and to employ the future POS data to generate predicted total revenues corresponding to the each of the subscribers over a payback period, and configured to employ new POS data to generate updated predicted total revenues corresponding to the each of the subscribers. The offer processor is configured to compare the updated predicted total revenues with the predicted total revenues and the updated PD values with the PD values, and configured to automatically generate and transmit engagement instructions for establishments that have received a capital product offer and whose updated PD has increased by more than a threshold amount over the PD.

20 Claims, 9 Drawing Sheets

(56) References Cited

U.S. PATENT DOCUMENTS

| | | |
|---|---|---|
| 7,966,256 B2 | 6/2011 | Liao et al. |
| 8,306,907 B2 | 11/2012 | Das |
| 8,458,074 B2 | 6/2013 | Showalter |
| 8,620,801 B2 | 12/2013 | Choudhuri et al. |
| 9,153,076 B1 | 10/2015 | Snyder et al. |
| 9,727,912 B1 | 8/2017 | Poursartip et al. |
| 9,773,242 B1* | 9/2017 | Boates ............... G06Q 20/353 |
| 9,805,338 B1 | 10/2017 | Ghosn et al. |
| 9,984,412 B1 | 5/2018 | Poursartip et al. |
| 10,019,698 B1 | 7/2018 | Scott et al. |
| 10,318,980 B2 | 6/2019 | Crowe et al. |
| 10,346,907 B1 | 7/2019 | Poursartip et al. |
| 2007/0067195 A1 | 3/2007 | Fahner et al. |
| 2010/0241539 A1 | 9/2010 | Baker |
| 2011/0047058 A1 | 2/2011 | Erbey et al. |
| 2012/0323760 A1* | 12/2012 | Lee ....................... G06Q 40/02 705/38 |
| 2013/0132269 A1 | 5/2013 | Abiola et al. |
| 2013/0218750 A1 | 8/2013 | Dornhelm et al. |
| 2013/0226830 A1 | 8/2013 | Long et al. |
| 2013/0311343 A1 | 11/2013 | Cole |
| 2013/0346284 A1 | 12/2013 | Stubbs et al. |
| 2014/0164192 A1 | 6/2014 | Brown et al. |
| 2014/0279380 A1 | 9/2014 | Melnichenko et al. |
| 2014/0324521 A1* | 10/2014 | Mun ....................... G06Q 10/04 705/7.28 |
| 2015/0134413 A1* | 5/2015 | Deshpande ........ G06Q 30/0202 705/7.31 |
| 2015/0324816 A1* | 11/2015 | Unser ................... G06Q 20/20 705/7.31 |
| 2015/0371335 A1 | 12/2015 | Liptak et al. |
| 2016/0140583 A1 | 5/2016 | Amemiya et al. |
| 2016/0371682 A1* | 12/2016 | Sprague ............... G06Q 20/387 |
| 2017/0072568 A1 | 3/2017 | Hitchcock et al. |
| 2017/0270603 A1 | 9/2017 | Berta et al. |
| 2017/0364803 A1* | 12/2017 | Calmon ............... G06N 3/0454 |
| 2018/0040064 A1 | 2/2018 | Grigg et al. |
| 2018/0150910 A1 | 5/2018 | Grech et al. |
| 2018/0365714 A1* | 12/2018 | Lei ......................... G06N 20/10 |
| 2019/0108507 A1 | 4/2019 | Cohen |
| 2019/0197617 A1 | 6/2019 | Chopra |
| 2019/0259047 A1 | 8/2019 | Bharti et al. |
| 2019/0311428 A1 | 10/2019 | Adjaoute |
| 2020/0265512 A1 | 8/2020 | James et al. |

FOREIGN PATENT DOCUMENTS

| | | |
|---|---|---|
| JP | 2006309519 A | 11/2006 |
| JP | 2008204214 A | 9/2008 |
| JP | 2016183545 A | 10/2016 |
| KR | 101903934 B1 | 10/2018 |
| KR | 101928290 B1 | 12/2018 |
| WO | WO2012018968 A1 | 2/2012 |

OTHER PUBLICATIONS

Sun, Hui et al. "Credit Risk Assessment Model of Small and Medium-Sized Enterprise Based on Logistic Regression." *2015 IEEE International Conference on Industrial Engineering and Engineering Management (IEEM)*. Singapore, Dec. 6-9, 2015. pp. 1714-1717.

Zhang, Lingying et al. "Study of Credit Risk for Capital-Intensive Industries Based on Logistic Model." *2009 International Conference on Information Management, Innovation Management and Industrial Engineering*, Xi-an, Dec. 26-27, 2009, pp. 390-393.

* cited by examiner

EXEMPLARY CAPITAL ORIGINATION INTERFACE

SYSTEM FOR AUTOMATED ORIGINATION OF CAPITAL CLIENT ENGAGEMENT BASED ON DEFAULT PROBABILITY DERIVED FROM POINT-OF-SALE DATA

CROSS-REFERENCE TO RELATED APPLICATIONS

This application is related to the following co-pending U.S. patent applications, each of which has a common assignee and common inventors, the entireties of which are herein incorporated by reference.

| Ser. No. | FILING DATE | TITLE |
| --- | --- | --- |
| 16/406,376 | May 8, 2019 | SYSTEM FOR AUTOMATED ORIGINATION OF CAPITAL BASED ON POINT-OF-SALE DATA |
| 16/406,406 | May 8, 2019 | SYSTEM FOR AUTOMATED ORIGINATION OF CAPITAL BASED ON POINT-OF-SALE DATA INFORMED BY LOCATION |
| 16/406,463 | May 8, 2019 | SYSTEM FOR AUTOMATED ORIGINATION OF CAPITAL BASED ON POINT-OF-SALE DATA INFORMED BY TIME OF YEAR |
| 16/406,550 | May 8, 2019 | DYNAMIC ORIGINATION OF CAPITAL PRICING BASED ON HISTORICAL POINT-OF-SALE DATA |
| 16/406,596 | May 8, 2019 | DYNAMIC ORIGINATION OF CAPITAL PRICING DETERMINATION BASED ON FORECASTED POINT-OF-SALE REVENUE |

BACKGROUND OF THE INVENTION

Field of the Invention

This invention relates in general to the field of capital origination and retail finance, and more particularly to a system for automated pricing, origination, and recovery of capital based on historical point-of-sale subscriber data.

Description of the Related Art

Any small-to-medium business (SMB) owner can attest to the lack of good funding sources. In particular, those SMB owners in the hospitality industry are keenly attuned to the dearth of sources for capital. In general, to obtain funding, the owners are required to generate a plethora of financial documents so that a conventional funding source (e.g., a public or private bank, private equity partnerships, angel funds, etc.) can analyze the owner's business to assess the risk of payback of a funded amount and to determine terms and conditions of the loan. These financial documents include balance sheets, income statements, tax returns, identifying information for obtaining credit reports, paid bills—the list goes on an on. If an owner takes the time and has the knowledge to generate and provide all the required documentation, then the lender reviews the documentation and looks for credit scores, derogotories (e.g., serious delinquency, bankruptcies, judgements, etc.), and credit history. The lender generally uses the provided financial statements to calculate conventional metrics such as debt-to-income (DTI) ratio, debt service coverage ratio (DSCR), percent of credit above a prescribed threshold, etc. If the owner applicant meets all the criteria of the lender, then a capital is priced and offered. If the owner accepts, the capital is originated and the owner is then required to make periodic payments, usually monthly, to the lender in order to pay back the loan.

Anyone who has purchased a home will concur that the loan applications process is onerous at best and requires a substantial amount of time. For large businesses that have dedicated financial departments, the process of obtaining capital is rote, as one skilled in the art will concur, because virtually all lending sources use the same, one-size-fits-all process for loan applications and underwriting. But for SMB establishment owners, any time taken away from hands-on management of their business results in decreased profits. So, many SMB owners either use a credit card (at significant interest rates) or forego any capital improvements altogether, primarily because of the time and hassle associated with the capital origination process.

In addition, the process followed by most lenders compares applicants in one industry to those in all industries. For example, the same credit threshold may be employed in the process to underwrite a loan to a restaurant owner as is employed to underwrite loans to, say, a law firm or medical practice. And those in the hospitality industry appreciate that many hospitality businesses are seasonal (e.g., ice cream shops, ski resorts, etc.) and geographic (e.g., metropolitan, rural, tourist area, etc.) and that these types of businesses should not be lumped into the aforementioned one-size-fits-all paradigm when seeking and pricing capital.

The present inventors have sensed a need in the art to underwrite and originate capital to those owners who typically don't have the time or resources to generate the above-noted conventional credit application data and to additionally recover acquired capital.

The present inventors have also sensed a need for variable underwriting methods that determine whether a business is "good" or "bad" by comparing it to other similar and surrounding businesses. For instance, the present inventors have noted that is it more desirable to judge a pizza restaurant as compared to other pizza restaurants in the city or county.

Therefore, what is needed is a system for underwriting capital offers to SMBs that does not require conventional loan application documentation.

What is also needed is a system for underwriting capital offers to SMBs that compares a given business with other similar businesses operating in the same geographic area.

What is additionally needed is a technique for pricing capital product offers that employs historical point-of-sale (POS) data for a business in order to price loan offers and to predict whether that business will repay a loan.

What is furthermore needed is a system that automatically tenders capital product offers, that dynamically changes terms of the offers based on changing POS data, and that automatically collects payments to recover originated capital.

SUMMARY OF THE INVENTION

The present invention, among other applications, is directed to solving the above-noted problems and addresses other problems, disadvantages, and limitations of the prior art by providing a superior technique for underwriting, proffering, and managing merchant cash advance offers to business owners. In one embodiment, a system for automated origination of capital client engagement is provided. The system includes a rate processor, a revenue forecaster, and an offer processor. The rate processor is configured to perform a binary logistic regression on subscriber data and metrics derived from historical POS data corresponding to subscribers of a point-of-sale (POS) subscription service to generate logistic regression coefficients that are used to calculate probability of default (PD) values for each of the subscribers, and configured to employ new subscriber data and metrics to generate updated PD values for the each of the subscribers. The revenue forecaster is coupled to the rate processor and is configured to employ the historical POS data to predict future POS data for establishments corresponding to the each of the subscribers, and to employ the future POS data to generate predicted total revenues corresponding to the each of the subscribers over a payback period, and configured to employ new POS data to generate updated predicted total revenues corresponding to the each of the subscribers. The offer processor is configured to compare the updated predicted total revenues with the predicted total revenues and the updated PD values with the PD values, and configured to automatically generate and transmit engagement instructions for establishments that have received a capital product offer and whose updated PD has increased by more than a threshold amount over the PD.

One aspect of the present invention contemplates a system for automated origination of capital client engagement, that has a rate processor, a revenue forecaster, and an offer processor. The rate processor is configured to perform a binary logistic regression on subscriber data and metrics derived from historical POS data corresponding to subscribers of a restaurant point-of-sale (POS) subscription service to generate logistic regression coefficients that are used to calculate probability of default (PD) values for each of the subscribers, and configured to employ new subscriber data and metrics to generate updated PD values for the each of the subscribers. The revenue forecaster is coupled to the rate processor and is configured to employ the historical POS data to predict future POS data for restaurants corresponding to the each of the subscribers, and to employ the future POS data to generate predicted total revenues corresponding to the each of the subscribers over a payback period, and configured to employ new POS data to generate updated predicted total revenues corresponding to the each of the subscribers. The offer processor is configured to compare the updated predicted total revenues with the predicted total revenues and the updated PD values with the PD values, and configured to automatically generate and transmit engagement instructions for restaurants that have received a capital product offer and whose updated PD has increased by more than a threshold over the PD.

Another aspect of the present invention comprehends a method for automated origination of capital client engagement, the method comprising: performing a binary logistic regression on subscriber data and metrics derived from historical POS data corresponding to subscribers of a point-of-sale (POS) subscription service to generate logistic regression coefficients that are used to calculate probability of default (PD) values for each of the subscribers, and employing new subscriber data and metrics to generate updated PD values for the each of the subscribers; employing the historical POS data to predict future POS data for establishments corresponding to the each of the subscribers, and using the future POS data to generate predicted total revenues corresponding to the each of the subscribers over a payback period, and employing new POS data to generate updated predicted total revenues corresponding to the each of the subscribers; and comparing the updated predicted total revenues with the predicted total revenues and the updated PD values with the PD values, and automatically generating and transmitting engagement instructions for establishments that have received a capital product offer and whose updated PD has increased by more than a threshold amount over the PD.

BRIEF DESCRIPTION OF THE DRAWINGS

These and other objects, features, and advantages of the present invention will become better understood with regard to the following description, and accompanying drawings where.

DETAILED DESCRIPTION

Figure 1:
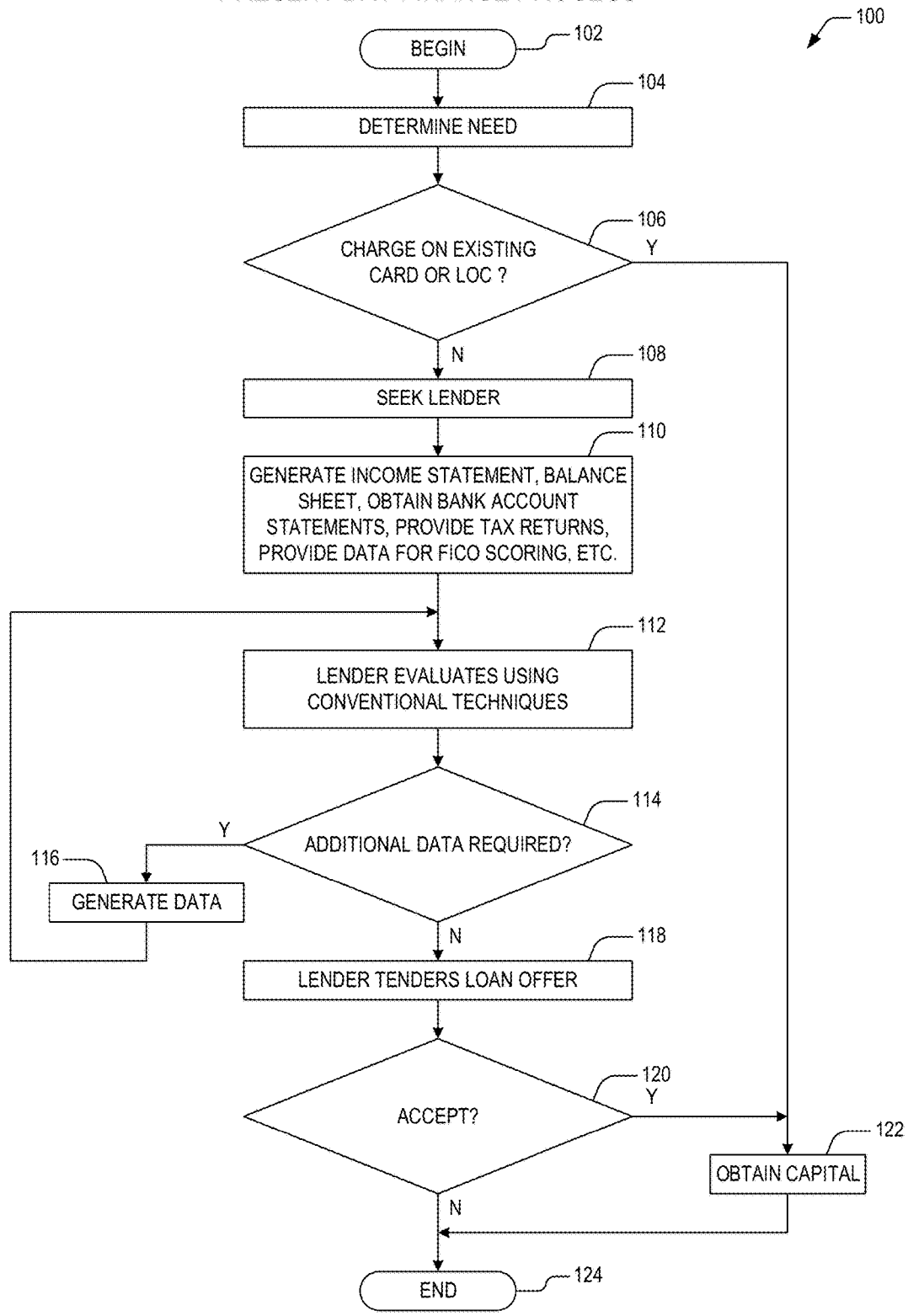
FIG. 1 is a flow diagram illustrating a present-day process that a retail establishment owner may apply for obtaining capital.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application," "application," "application program," "app," "computer program," or "program") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

x86-Compatible Microprocessor: A microprocessor capable of executing computer applications that are programmed according to the x86 ISA.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

In view of the above background discussion on capital origination and associated techniques employed by present-day establishments to obtain capital, a discussion of these techniques along with their disadvantages and limitations will now be presented with reference to FIG. 1. Following this, a discussion of the present invention will be provided with reference to FIGS. 2-12. The present invention overcomes the problems associated with present-day techniques by providing apparatus and methods whereby retail establishment owners may obtain capital products in a timely and easy manner, where terms and conditions, including pricing, of offers for capital products are generated based primarily on point-of-sale data history, thus providing significant improvements in this field of technology.

Turning to FIG. 1, a flow diagram illustrating a present-day process that a retail establishment owner may apply for obtaining capital. Flow begins at block 102. Consider that a retail establishment owner may desire short-term financing to make manage or grow their establishment. Although the term "owner" will be employed herein, it is noted that the term is intended to mean an ownership entity that includes, but is not limited to sole proprietors, partnerships, corporations, limited liability companies, trusts, and any individual that is authorized by the owner to obtain financing on the owner's behalf. Flow then proceeds to block 104.

At block 104, the owner determines a need for capital. For instance, perhaps the owner desires to add seating, provide weatherization, hire new personnel, purchase costly equipment, or expand operations. The need and amount of capital are thus determined. Flow then proceeds to decision block 106.

At decision block 106, the owner determines whether to obtain financing for the needed capital by using an existing credit card or other line of credit. If so, then flow proceeds to block 122. If not, then flow proceeds to block 108.

At block 108, the owner is forced to seek a source for the needed capital, and thus the owner may apply to one or more sources, typically banks, investors, or private equity. Flow then proceeds to block 110.

At block 110, a potential lending source may require the owner to provide documentation suitable for underwriting and pricing a capital product. As one skilled in the art will appreciate, capital products come on many different forms including lines of credit, loans, merchant cash advances, mortgages, asset-backed securities, and collateralized debt obligations, and though these products differ in terms of how the capital is originated and recovered, they all must be priced. That is, the capital originator must determine the risk associated with providing the needed capital to the owner, and then generate terms (e.g., interest rate, annual percentage rate, discount, fixed fee, etc.) for origination of the capital along with terms for recovery (payback). Regardless of the type of product, this documentation is standard for virtually all originators and may include a recent income statement and balance sheet, several months of bank account statements, one to three years of business tax returns, Social Security Numbers and Federal Employer Identification Numbers for purposes of obtaining personal and business credit scores, etc. Flow then proceeds to block 112.

At block 112, the originator (e.g., lender) evaluates all of the documentation provided in block 110 to determine a price for the capital that may include a maximum amount, an interest rate or fixed fee, and a payment schedule. Flow then proceeds to decision block 114.

At decision block 114, depending upon the outcome of the originator's evaluation generated at block 112, the originator may require the owner to provide additional data in order for the originator to underwrite the desired capital. Such data may include statements from additional accounts, financial condition reports, and co-sign commitments. If more data is required, the flow proceeds to block 116. If not, flow proceeds to block 118.

At block 116, the owner generates and provides the additional data, and flow proceeds back to block 112, where the additional data is added to the evaluation process. It is noted the originator's requests for additional data may require more than one iteration, which is problematic for any borrower, but for small to medium businesses (SMBs) that cannot afford the luxury of a financial department, the time required to apply for a loan could mean the difference between profit and loss because generation of the required documentation require attention that would otherwise be directed to operation of the business.

At block 118, the capital source tenders an offer, typically consisting of a disbursed amount or maximum amount, an interest rate, and a payment schedule. Flow then proceeds to decision block 120.

At decision block 120, the owner decides whether or not to accept the offer tendered at block 118. If so, then flow proceeds to block 122. If not flow proceeds to block 124.

At block 122, the owner obtains the needed capital, either via charges to an existing credit card or line of credit, or from the capital source that tendered the offer at block 118. Flow then proceeds to block 124.

At block 124, the method completes.

The present inventors have observed that virtually all capital product sources rely upon a one-size-fits-all process for underwriting. Not only is it difficult for an owner to generate the documentation required by conventional sources of financing, but it is also time-consuming. And for owners of SMBs in particular, timing of a loan with the right terms may be a significant factor associated with the need. Moreover, should an owner decide to accept financing from a conventional source, the requirement to make monthly payments may add to the number of tasks that the owner has to manage.

The present inventors have also noted that conventional underwriting processes may not be the best way to evaluate whether a borrower will repay according to terms and conditions set forth, and furthermore may not provide a sufficient basis for pricing a capital product. For example, for SMBs within a particular business category, the present inventors note that historical point-of-sale (POS) subscriber data is a better predictor for repayment and is more useful for capital product pricing than documentation used by conventional underwriters, especially for those SMBs that exhibit seasonal fluctuations in revenue. Accordingly, systems and methods for automated origination of capital will now be discussed with reference to FIGS. 2-12 that overcomes all of the above-noted disadvantages and limitations, and others, by providing mechanisms that dynamically determine pricing for capital products to merchants (i.e., owners) based exclusively on subscriber POS data, and that automatically provide for capital offers and payment collection.

The present inventors have noted that the inventive concepts disclosed herein are very applicable to SMBs in the hospitality industry, namely, those SMBs in the food and beverage sector (e.g., quick- and full-service restaurants, food trucks, bars, etc.), the travel and tourism sector (e.g., charter services), the lodging sector (e.g., hotels, motels, hostels, campgrounds), and the recreation sector (e.g., theaters, museums, zoos, concerts, spectator sports). Because, as one skilled in the art will appreciate, the food and beverage sector is by far the largest segment of the hospitality industry, to clearly teach relevant aspects of the present invention the following discussion will be expressed in terms employed by restaurants (of any sort), where the owners may subscribe to a system for, among other things, processing of POS credit card transactions. More often than not, restaurants obtain capital through merchant cash advances (MCAs), and as such the following discussion may employ this type of capital product to more clearly teach aspects of the present invention. Though the following discussion will use terms often applicable to restaurants, the present inventors note that the principles and techniques disclosure may be adapted to other embodiments in the hospitality industry, to virtually all forms of capital products as noted above, and furthermore to embodiments in other industries.

Figure 2:
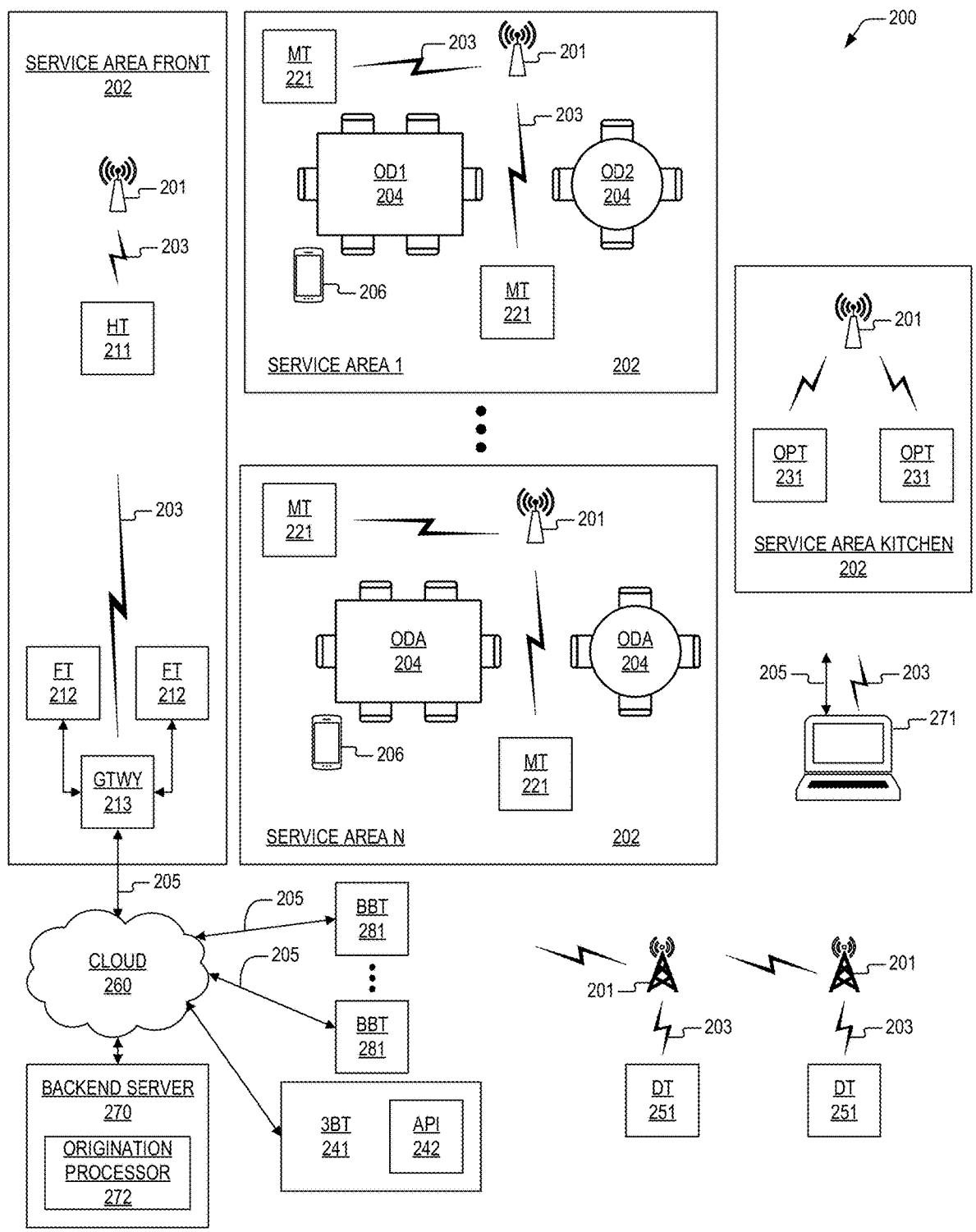
FIG. 2 is a block diagram depicting a point-of-sale synchronization system according to the present invention.

Turning to FIG. 2, a block diagram is presented depicting a synchronization system 200 for point-of-sale (POS) terminals according to the present invention. The synchronization system 200 may include one or more service areas 202, such as a front service area 202, service area 1-service area N 202, and service area kitchen 202. As noted above, restaurant terms such as host, wait staff, cook, kitchen, food item, etc. may be employed to clearly teach the present invention in a given context; however, broader and different retail establishment types are contemplated.

The service areas 202 may comprise one or more wireless access points 201. The service areas 202 may also comprise one or more wireless POS terminals 211, 221, 231, coupled to the access points 201 via wireless links 203, and which are distinguished in the system 200 as a host terminal 211, mobile terminals 221, and order processing terminals 231. Typically, the mobile POS terminals 221 are of an 8-inch handheld display size, though other sizes are contemplated. The host terminals 211 may be coupled to the access points 201 via wireless links 203. Alternatively, the host terminals 211 may be hardwired. The service areas 202 fixed terminals 212 are hardwired to a gateway 213. Alternatively, one or more of the fixed terminals 212 may be coupled to the access points 201 via the wireless links 203. Typically, the host terminals 211 and fixed terminals 212 are approximately of a 15-inch POS display size, though other sizes are contemplated. The order processing terminals 231 are coupled to the access points 201 via the wireless links 203. Alternatively, the order processing terminals 231 may be hardwired to the gateway 213. Typically, the order processing terminals 231 are approximately of a 22-inch display size for ease of use in a kitchen 202 or other order processing area 202, though other sizes are contemplated. Thus, the mobile terminals 221 are referred to as such because they move about the service areas 202. As a result, the mobile terminals are all coupled to the access points 201 via the wireless links 203. The host terminal 211 may be moved about the services areas 202 as well, in which case it will be categorized as mobile, though having a larger display size generally than the mobile terminals. Or the host terminal 211 may be in a fixed location, typically mounted to a stand (not shown), and may be wireless or hardwired. When in a fixed location, the host terminal 211 is categorized as fixed.

The gateway 213 provides for coupling of the terminals 212 (optionally, 221, 231) that are hardwired and access points 201 an internet cloud 260 via conventional wired links 205 such as, but not limited to, Ethernet, cable, fiber optic, and digital subscriber line (DSL). As part of the network path to and through the cloud 260, providers of internet connectivity (e.g., ISPs) may employ wireless technologies from point to point, etc., but for purposes of this application, such links 205 will be referred to as conventional wired links 205 to distinguish them from local and cellular wireless links. The wireless links 203 may comprise, but are not limited to, Wi-Fi, Bluetooth, near field communications, infrared links, IEEE 802.15.4, Zigbee radio links, and cellular based links (e.g., 3G, 4G, LTE, 5G) or a combination of the noted links. The POS terminals 211, 212, 221, 231 may be configured differently to comport with intended function (i.e., host seating, order entry, order fulfillment, payment processing, owner engagement, etc.), or they may be configured similarly. In one embodiment, the mobile terminals 221 may comprise a touch screen display and integral payment processor (e.g., card/chip/tap readers) that provides for both order entry, display of order status, and payment processing. The host terminal 211, fixed terminals 212, and order processing terminals 231 may comprise larger touch screens to allow for easier viewing by restaurant staff, or they may comprise displays with keyboard entry. In one embodiment, terminals 211, 212, 231 may comprise desktop computers, laptop computers, smartphones, or tablets that are running application programs or web-enabled application programs that provide for communication with a backend server 270 for purposes of order entry, status updates, and optionally, payment processing. In one embodiment, one or more of the terminals that are characterized as fixed may comprise an integral payment processor (i.e., card/chip/tap reader) that provides for payment processing.

The backend server 270 is coupled to the internet cloud 260 and to an administrative console 271 that is operably coupled to the backend server 270 via a conventional wired link 205 and/or a wireless link 203. The backend server 270 is not on-premise and is thus referred to as a cloud server 270. The backend server 270 may comprise a capital origination processor 272, as will be described in further detail hereinbelow.

The administrative console 271 may be disposed within the restaurant premises and coupled to the backend server 270 via the links 203, 205, or the console 271 may be disposed in another location, say, at an operations center for multiple restaurants within a given region. In addition, the system 200 may comprise one or more browser-based terminals 281 that are coupled to the backend server 270 via links 205. In one embodiment, the browser-based terminals 281 may comprise desktop computers, laptop, computers, smartphones, or tablets that are running stand-alone applications or web-enabled applications that provide for communication with the backend server 270 for purposes of order entry, status updates, and optionally, payment processing, where payment data is manually entered.

The system 200 may further comprise one or more third-party-based terminals 241 that are coupled to the backend server 270 via the conventional links 205 though the cloud 260. The third party-based terminals 241 may comprise desktop computers, laptop, computers, smartphones, or tablets that are running stand-alone third-party applications or web-enabled third-party applications that provide for communication with the backend server 270 for purposes of order entry, status updates, and optionally, payment processing via a proprietary application programming interface (API) 242. An example of such a terminal 241 may include the well-known GrubHub® third-party application that is configured to communicate with the backend server 270 via the API 242.

The system 200 may additionally comprise one or more mobile delivery terminals 251 that are coupled to one or more cellular access points 201 via conventional cellular wireless links 203, and the cellular access points 201 are coupled to the backend server 270 via the cloud 260. In one embodiment, the delivery terminals 251 are identical to the mobile terminals 221, and are configured to provide services for order entry, order fulfillment (i.e., delivery), and payment processing. In another embodiment, the delivery terminals 251 are disposed as smartphone or tablets with a detachable payment processor (e.g., card/chip/tap reader). In a further embodiment, the delivery terminals 251 are disposed as smartphone or tablets with a payment processor integrated within a single housing. Other embodiments are contemplated.

Service areas 202 corresponding to the mobile terminals 221 may have one or more tables 204 corresponding to one or more orders. For clarity, service area 1 202 depicts two tables 204, one of which corresponds to order 1 OD1, and the other of which corresponds to order 2 OD2. The mobile terminals 221 within service area 1 202 may processes portions of both order 1 OD1 and order 2 OD2. Service area N 202 depicts two tables 204, both of which correspond to order A ODA. The mobile terminals 221 within service area N 202 may both process portions order A ODA. Though disposed within separate service areas (service area 1 202-service area N 202), the mobile terminals 221 therein may be further configured to process portions of any and all orders within the restaurant and may roam from service area 202 to service area to support work load of the restaurant.

The order processing terminals 231 may process all orders in the restaurant, or they may be configured to each process a portion of all of the orders in the restaurant according to preparation station or inventory station.

The host terminal 211 and fixed terminals 212 may be configured to process all orders in the restaurant to provide for on-premise seating assignment, order initiation, order selection, and payment processing, including closeout of orders.

One or more of the terminals host terminals 211, fixed terminals 212, mobile terminals 221, and order processing terminals 231 may be configured in an owner mode as will be described in further detail below, to allow an owner of the restaurant to transmit and receive messages from the backend server 270 that are relevant to management of the restaurant. The types of functions that are enabled when in owner mode may include POS subscription services management, views of POS totals and statistical metrics for programmable periods (e.g., daily, weekly, monthly, yearly), comparisons of POS totals and statistical metrics from two or more programmable periods (e.g., Q1 2016, Q1 2017, Q1 2018), views of fixed and variable POS subscriber charges (including credit card processing fees and terms for originated capital products), communications with POS subscription support staff and regional representative, and dynamic capital product offers and terms.

One or more restaurant staff members (not shown) within service area 1 202-service area N 202 may have a personal device (e.g., smartphone, tablet, laptop) 206 that can provide an ad hoc network (i.e., hotspot) to which one or more of the mobile terminals 221 may tether for purposes of communicating with the backend server 270 in the absence of Wi-Fi connectivity to the access points 201.

In one embodiment, operations are initiated when the one or more patrons enter the restaurant. Generally, a host (not shown) will create an order (along with corresponding order identifier (OID) via the host terminal 211 for the one or more patrons and will seat the patrons at one or more tables 204. The created order may include service area designation and assignment of the order to one or more mobile terminals 221. In another embodiment, mobile terminals 221 within a service area 202 are assigned to all orders within that service area 202. Other embodiments are contemplated. The created order and service area assignment are transmitted over the cloud 260 to the backend server 270, which maintains durable terminal queues within which are stored order updates for all orders in the restaurant. Each of the plurality of durable terminal queues corresponds to each of the POS terminals 211, 212, 221, 231, 251 within the system 200. When connection status to a given terminal 211, 212, 221, 231, 251 is down (i.e., the server 270 cannot verify communication with the given terminal 211, 212, 221, 231, 251), then the server 270 maintains the order updates for that terminal 211, 212, 221, 231, 251 until connectivity is reestablished, at which time the server 270 may transmit one or more of the order updates to the terminal, verifying with each transmission that the terminal 211, 212, 221, 231, 251 received the update. Advantageously, each of the terminals 211, 212, 221, 231, 251 is capable of processing portions of any of the orders in the restaurant.

Likewise, each of the terminals 211, 212, 221, 231, 251 maintains durable order queues within which are stored order updates only for each of the orders being processed by the terminal 211, 212, 221, 231, 251. Each of the 211, 212, 221, 231, 251 also maintains a plurality of order states that depict a current state for each of the orders in the restaurant. As a patron selects one or more menu items, wait staff enters the menu items as an update in one of the terminals 211, 212, 221, 231, 251, generally a mobile terminal 221 assigned to the given service area 202. The order update is entered into one of the durable order queues that corresponds to the order ID. If connectivity is present, then the terminal 211, 212, 221, 231, 251 transmits the order update to the server 270 and waits for the server 270 to acknowledge the order update. If acknowledged, the terminal 211, 212, 221, 231, 251 removes the order update from the one of the durable order queues. If unacknowledged (i.e., in the case of non-persistent network connectivity), the terminal 211, 212, 221, 231, 251 maintains the order update in the one of the durable order queues until such time as connectivity is reestablished, and the terminal 211, 212, 221, 231, 251 completes transmission of the order update with acknowledgement by the server 270.

Upon reception of a particular update from the server 270, the terminals 211, 212, 221, 231, 251 may check one of their plurality of order states that correspond to the particular update for conflicts. If a conflict exists, the terminals 211, 212, 221, 231, 251 may utilize domain specific rules to resolve the conflict in order to establish a valid order state. Each of the terminals 211, 212, 221, 231, 251 is configured with the same domain specific rules to provide for consistent resolution of order states.

As patrons continue to order items corresponding to the order ID, the one or more of the terminals 211, 212, 221, 231, 251 may enter the order updates and transmit/durably queue the order updates to the server 270 in accordance with connectivity conditions. The server 270 may also queue/transmit order updates for all orders in the restaurant to each of the terminals 211, 212, 221, 231, 251 according each terminal's connectivity. Order fulfillment, payment, and closeout are likewise handled as order updates through the server 270 and are queued/transmitted to all of the terminals 211, 212, 221, 231, 251 in accordance with the connection status of each terminal.

Patrons outside of the restaurant are handled in similar fashion via the browser-based terminals 281, and third-party terminals 241, though without synchronous feedback from the server 270 regarding all orders in the restaurant. When accessed through the browser-based terminals 281 and third-party terminals 241, the server 270 creates and order ID and assigns it to one of the order processing terminals 231 for fulfillment, while sending status updates on the order ID to all of the terminals 211, 212, 221, 231, 251 via the durable terminal queue therein. The server 270 may designate a specific delivery terminal 251 for pickup, delivery, and payment based upon geofenced proximity to the restaurant, or based upon workload corresponding to the delivery terminal. Proximity to the restaurant may be determined by a number of different mechanisms, as will be described in further detail below.

The administrative console 271 may maintain a master record of all order states and order updates according to all of the terminals 211, 212, 221, 231, 251 in order to provide for restaurant management, maintenance, analytics, and network traffic analyses. The console 271 may alternatively be disposed in an expediter's area of the restaurant for use by expediters in assignment and allocation of patron seating and terminals 211, 212, 221, 231, 251. The console 271 may further be configured to operate in an owner mode, as described above.

The durable terminal queues and durable order queues may be disposed as battery backed random-access memory, electrically-erasable programmable read-only memory, solid state memory, hard disk memory, or a combination of the above that will provide for maintaining order updates within the queues across network and power interruptions.

Advantageously, the present invention provides for more efficient performance of computational resources within the server 270 and the POS terminals 211, 212, 221, 231, 251 over that which has heretofore been provided because multiple 211, 212, 221, 231, 251 may be assigned to process portions of a single order, resulting in more timely processing of the single order. Similarly, any of the 211, 212, 221, 231, 251 in the restaurant may be immediately reassigned to a particular order to replace a malfunctioning terminal or to increase throughput of the server 270. Accordingly, computational resources 211, 212, 221, 231, 251, 270 within the system 200 are afforded an overall performance improvement as a result of the present invention.

Figure 3:
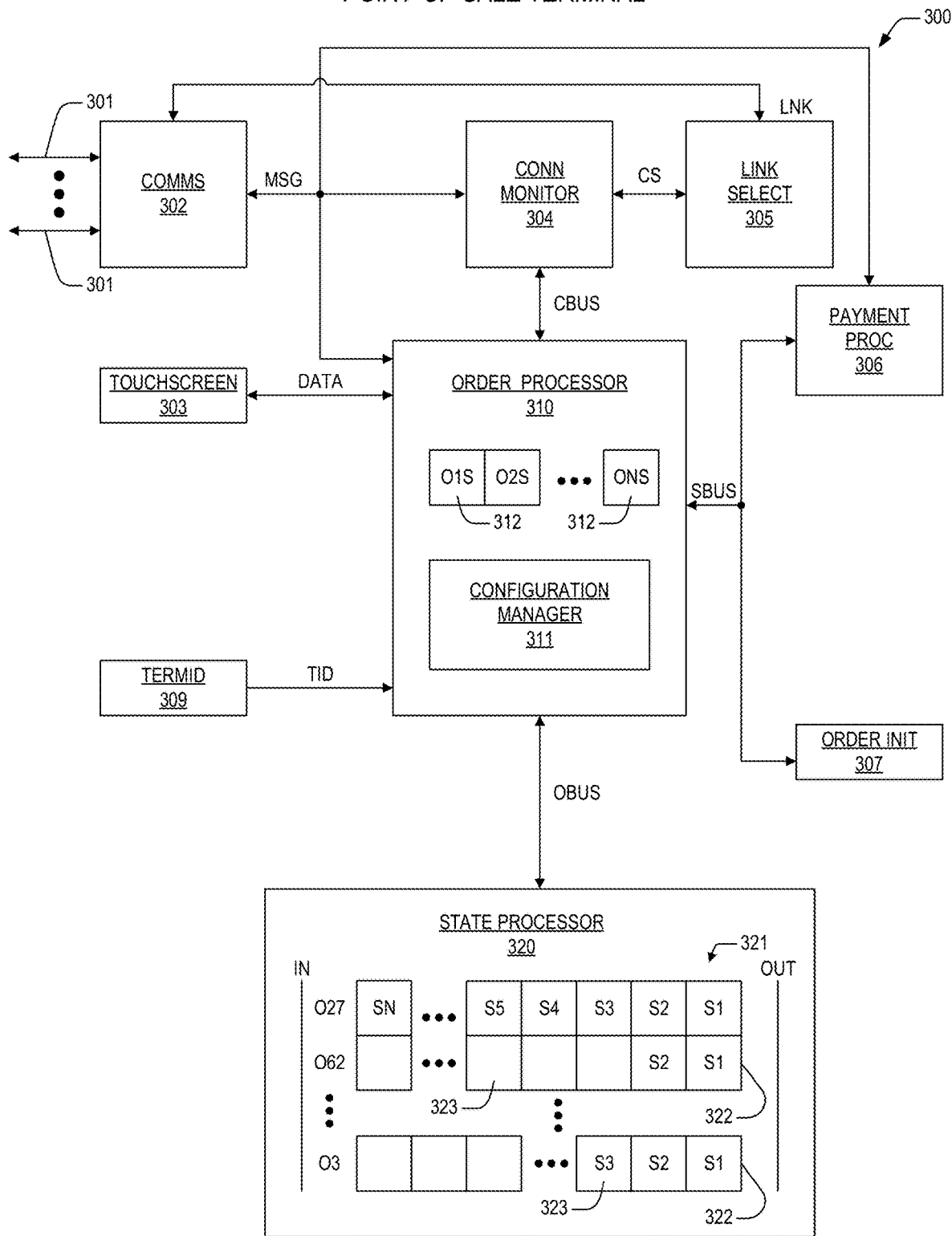
FIG. 3 is a block diagram featuring a point-of-sale terminal according to the present invention.

Now referring to FIG. 3, a block diagram is presented featuring a POS terminal 300 according to the present invention. The POS terminal 300 may be characterized as fixed or mobile. When characterized as fixed, the POS terminal 300 may be hardwired to a gateway or may be coupled to the gateway via wireless access points, as described above with reference to FIG. 2. The terminal 300 may comprise a communications circuit COMMS 302 (e.g., transceivers, modems, message formatter, etc.) that is coupled to one or more wired or wireless communications links 301, examples of which are described above with reference to FIG. 1. The terminal 300 may also comprise a connection monitor 304, an order processor 310, a and a payment processing element 306, all of which are coupled to COMMS 302 via a message bus MSG. The terminal 300 may also comprise a link select element 305 that is coupled to the connection monitor 304 via bus CS and to the COMMS 302 via bus LNK. The order processor 310 is coupled to the connection monitor 304 via bus CBUS and to the payment processor 306 and an order initiation element 307 via bus SBUS. The order processor 310 is coupled to a touchscreen display 303 via bus DATA and to a terminal ID element 309 via bus TID. The order processor 310 is also coupled to a state processor 320 via a queue bus QBUS.

The state processor 320 may include a durable order update queue 321 that includes order update records 322, each of which are associated with a corresponding order for the terminal 300. Individual terminals 300 are identified by their corresponding terminal ID, which may be stored within and accessed from the terminal ID element 309. The terminal ID element 309 also is employed for storage and retrieval of terminal configuration information (e.g., order processing terminal, kiosk, mobile terminal, host terminal, owner mode terminal, etc.).

Each of the order update records 322 may comprise order state fields 323, which are employed to queue order state changes (i.e., order updates) for transmission to a backend server (not shown) as connectivity to the backend server permits. State fields 323 nearest to OUT are the oldest order state changes queued for transmission to the backend server. State fields 323 nearest to IN are youngest (or most recent) order state changes queued for transmission to the backend server. Fields 323 between the oldest state fields 323 and the youngest state fields 323 descend in age from oldest to youngest order state change according to when those state changes are entered by the terminal 300.

Values of the order state fields 323 may include, but are not limited to, an order ID along with order details taken by the terminal 300. Accordingly, the order update record 322 for order 27 O27 depicts a plurality of order state fields 323 to be transmitted to the server when connectivity is reestablished. In decreasing age from oldest to youngest order state change, the fields 323 depict order state changes S1 through SN. As one skilled in the art will appreciate, the order update record 322 O27 depicts that many more state changes have been entered while connection status of the terminal 300 is down than have been entered for order 62 O62 through order 3 O3. Advantageously, the terminal 300 according to the present invention may be employed for entry of order updates even in the presence of network interruptions, which is characteristic of most Wi-Fi networks.

In operation, order state changes S1-SN result from two sources: the touchscreen 303 and messages received over COMMS 302 from the backend server. In the first case, wait staff may enter menu items as requested by patrons, or in the case that the terminal 300 is configured as a kiosk 300, the patrons may enter the order items themselves. The present invention contemplates provisions within the terminal 300 to display menu selections and payment options to both wait staff and patrons. Order items received from the touchscreen display 303 are provided to the order processor 310 via bus DATA, which generates the state changes. State changes S1-SN received from the backend server are provided to the order processor 310 via messages received over bus MSG. The terminal 300 may be further configured as a tableside kiosk 300 that is unattended, such as in found in some restaurants and activity concepts like bowling alleys, golf gaming venues (e.g., Topgolf). As a tableside kiosk 300, patrons are enabled to add to existing orders to purchase additional items. The terminal 300 may further be configured to operate in an owner mode that comprises the owner functions discussed above with reference to FIG. 2.

The connection monitor 304 may monitor reception of a first message (e.g., a ping message) from the backend server and direct transmission of an acknowledgement message. The connection monitor 304 may update the connectivity status of the terminal 300 accordingly. In one embodiment, acknowledgment may comprise a simple acknowledge message. In other embodiments, acknowledgement may comprise additional data such as received signal strength indication RSSI associated with one or more access points, number of hops between the backend server and the terminal 300, or Global Positioning System (GPS) coordinates.

The link select element 305 may be employed to direct the COMMS 302 to change links 301 over which to communicate with the backend server, such as switching from Wi-Fi to LTE, for example. In one embodiment, in the absence of connectivity within the restaurant, the link select element 305 may direct the COMMS 302 to tether to a cellular equipped device corresponding to an order ID, such as devices 106 in FIG. 1, in order to transmit acknowledgements and order state changes to the backend server.

The connection monitor 304 may provide connectivity status of the terminal 300 to the order processor 310 via bus CBUS. In one embodiment, the order processor 310 may generate order state change messages from oldest to youngest update for each of the orders in the queue 321. Connectivity is maintained when the terminal 300 receives acknowledgement of a previously transmitted order state change message from the backend server. Once acknowledged, the order processor 310 directs the state processor 320 to delete the oldest state change update for a corresponding order ID and shift pending updates so that the next oldest state change update becomes the oldest order update. In one embodiment, state change updates are transmitted to the backend server until its order state change record 322 is empty, or until connectivity goes down.

As discussed above, the terminal 300 may be configured as a fixed or mobile POS terminal, a kiosk, a host terminal, a management terminal, an order processing terminal, or an owner mode terminal, where configurations differ principally in size of the touchscreen display 303 and configuration of displayed items and available functions and controls. The configuration parameters for the terminal 300 are stored in the terminal ID 309 element, and the configuration parameters/features are accessed by a configuration manager 311 within the order processor 310 upon initialization/reconfiguration of the terminal 300. Thus, the configuration manager 311 may generate images for display on the touchscreen 303 and capture text and touches thereon, in accordance with functions prescribed according to configuration parameters/features accessed from the terminal ID element 309.

Messages received from the communications circuit 302 may also require additional functions to be performed by the terminal 300. For example, when orders are placed by a browser-based or third-party based terminal, the backend server may transmit the order state change to the terminal 300 and the order processor 310 may direct the state processor 320 to create a corresponding order status record 322 in the queue 321. Similarly, when processing of transactions outside of the terminal's capabilities (e.g., financial transactions with credit card providers, loyalty card discounts, merchant cash advances, etc.) are required, order processor 310 may direct the payment processor 306 to generate messages to the backend server to provide data (e.g., amounts, payment source type, card swipe/chip information, capital product agreements, etc.) to complete the transactions. Such messages are transmitted via COMMS 302. The payment processor 304 may further receive state changes (e.g., "order paid," "payment source 1 approved," "discount amount," "MCA approved," "loan terms updated," "holdback percentage changes," etc.) to from the backend server and may provide these state changes to the order processor 310 via TBUS. The order processor 310 may then provide those updates to the queue 321 via OBUS. The terminal 300 may further be employed to create an order. Accordingly, from order entry data received over DATA, the order processor 310 may direct the order initiation element 307 to create an order ID and may also direct the state processor 320 to create a corresponding order state record 322 in the queue 321.

The terminal 300 terminal according to the present invention is employed to maintain a current state of all orders being fulfilled by the restaurant. The current state of each of the orders is stored in order current state fields 312 within the order processor 310. The order processor 310 may also comprise domain specific rules (not shown), which define actions required to synchronize conflicting order state changes being received and/or processed by the terminal 300, where the domain specific rules are unique to the restaurant. For example, suppose that one terminal 300 transmits a state change for a specific order to the backend server, which is acknowledged by the backend server. Concurrently, a second terminal 300 sends a state change for the same order. The backend server may respond to the second terminal with a message indicating that the order current state field 312 for the order ID within the second POS terminal 300 state is out of date (due to connection status) and providing the most recent current state of the order. The domain specific rules are employed by the order processor 310 within the second terminal 300 to merge the state changes local to the second terminal 300 and may store the merged state in the corresponding current state field 312. The order processor 310 may then direct the COMMS 302 to transmit the corresponding (reconciled) state field 312 contents to the backend server for distribution to all of the terminals 300 in the restaurant.

Advantageously, the present invention provides for improvements in performance of computational resources within the terminals 300 over that which has heretofore been provided because the terminal 300 may be employed to process orders in the absence of network connectivity. In addition, unnecessary communications with the backend server are precluded due to on-board conflict resolution logic (not shown). Moreover, computing performance is increased because the terminal 300 may be employed to process any of the other orders within the restaurant because the current states of all restaurant orders are resident therein.

The terminal 300 according to the present invention is configured to perform the functions and operations as discussed above. The terminal 300 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 300 may be shared with other circuits, microcode, etc., that are employed to perform other functions and/or operations within the terminal 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The terminal 300 may be embodied as one or more central processing units (CPUs) that are coupled to transitory and non-transitory storage (i.e., memory), where one or more application programs that are configured to perform the functions discussed above are stored in the non-transitory storage, transferred to the transitory storage at run time, and executed by the one or more CPUs.

Figure 4:
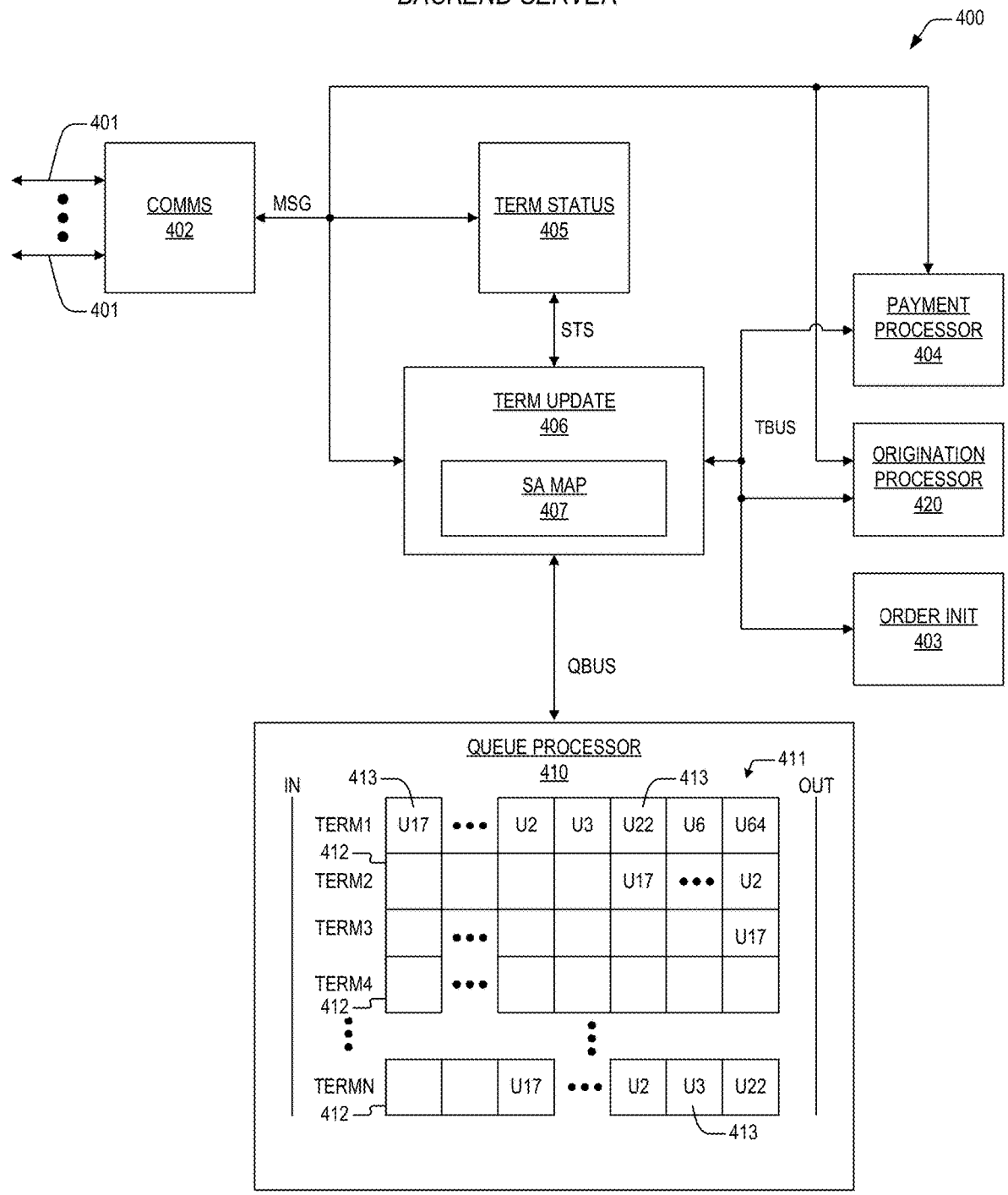
FIG. 4 is a block diagram showing a backend server according to the present invention.

Now turning to FIG. 4, a block diagram is presented showing a backend server 400 according to the present invention. The server 400 may comprise communications circuitry COMMS 402 (e.g., transceivers, modems, message formatter, etc.) that is coupled to one or more wired or wireless communications links 401, examples of which are described above with reference to FIG. 2. The server 400 may also comprise a terminal status element 405, a terminal update element 406, a payment processor 404, and a capital origination processor 420, all of which are coupled to COMMS 402 via a message bus MSG. The terminal status element 405 is coupled to the terminal update element 406 via a status bus STS. The terminal update element 406 may comprise a service area map SA MAP 407. The terminal update element 406 is coupled to the payment processor 404, the MCA processor 420, and an order initiation element 403 via a terminal bus TBUS. The terminal update element 406 is also coupled to a queue processor 410 via a queue bus QBUS.

The queue processor 410 may include a durable terminal queue 411 that includes terminal update records 412, each of which are associated with a corresponding terminal, such as the terminals 211, 212, 221, 231, 251 discussed with reference to FIG. 2, that are employed within a given restaurant. In the embodiment of FIG. 4, N terminal update records 412 are shown, each associated with a corresponding one of N terminals for the given restaurant. In a large restaurant or big box environment, N may be roughly equal to 30 terminals, though larger and smaller numbers are contemplated. In one embodiment, an admin console, like the console 271 of FIG. 2, may be designated as a terminal in the queue 411 for updates and messaging.

Each of the terminal update records 412 may comprise update fields 413, which are employed to queue order updates for transmission to each of the corresponding terminals as connectivity to the corresponding terminals permits. Update fields 413 nearest to OUT are the oldest order updates queued for transmission to the corresponding terminals. Update fields 413 nearest to IN are youngest (or most recent) order updates queued for transmission to the corresponding terminals. Fields 413 between the oldest order updates and the youngest order updates descend in age from oldest to youngest update according to when those updates are received from others of the corresponding terminals.

Values of the order update fields 413 may include, but are not limited to, an order ID along with order details, including payment information, taken by the others of the corresponding terminals. Accordingly, the terminal update record 412 for terminal 1 TERM1 depicts a plurality of order update fields 413 to be transmitted to TERM1 when connectivity is reestablished with TERM1. In decreasing age from oldest to youngest order update, the fields 413 depict updates to order 64 U64, then order 6 U6, then order 22 U22, and so on, culminating with an update to order 17 U17. As one skilled in the art will appreciate, the terminal update record 412 for TERM1 is indicative that TERM1 has been offline (i.e., no connectivity) longer than any of the other terminals in the restaurant. This length of time may correspond to a mobile terminal that is serving a party on a restaurant porch that has poor Wi-Fi connectivity, or may correspond to a delivery terminal that is traversing an area with poor cellular coverage. The terminal update records 412 corresponding to TERM2, TERM 3, and TERMN depict a number of populated order update fields 413 less than the number of fields for TERM1, which may correspond to terminals within the restaurant that have only slightly intermittent connectivity. And the terminal update record for TERM4 contains only empty order update fields 413, thus indicated that this terminal is up to date on all order state changes within the restaurant.

Operationally, the terminal status element 405 may periodically transmit a first message to each of the terminals and update the connectivity status of the terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication RSSI, number of hops, or Global Positioning System (GPS) coordinates. The acknowledge message may further comprise configuration identification data such as terminal configuration (e.g., mobile order entry, order processing, kiosk, management terminal).

The terminal status element 405 may provide connectivity status of each of the terminals to the terminal update element 406 via bus STS. The service area map 407 is a table that associates each of the terminals to one or more service areas within the restaurant, as described above with reference to FIG. 2. In one embodiment, the terminal update element 406 may generate order update messages from oldest to youngest update for each of the terminals that are connected. Connectivity is maintained when a terminal acknowledges receipt of an order update message. Once acknowledged, the terminal update element 406 directs the queue processor 410 to delete the oldest order update for that terminal and shift pending order updates so that the next oldest order update becomes the oldest order update. In one embodiment, order updates are transmitted to a given terminal until its terminal update record 412 is empty, or until connectivity is broken.

In one embodiment, all of the terminals associated with the restaurant are updated by the terminal update element 406. In an alternative embodiment, terminals are selectively updated in accordance with their mapping to the one or more service areas, as indicated by contents of the service area map 407. For example, delivery terminals may only require knowledge of orders that are to be delivered outside the restaurant, and thus they may be mapped to a "delivery" service area so that order updates that correspond to the delivery service area are transmitted to the delivery terminals. Similarly, the restaurant or retail establishment may be so large that management dedicates certain terminals to designate service areas. Accordingly, all of the terminals in a given service area may be employed to update any order placed within the given service area, but they may not be employed to update orders placed outside of the given service area. In like fashion, the service area map 407 may designate one or more of the terminals as an owner terminal operating in an owner mode, and may selectively update the owner terminals with information and messages that comport with management and finance of the restaurant, as is described above.

Messages received from the communications circuit 402 may also require additional functions to be performed by the backend server 400. For example, when orders are placed by a browser-based or third-party based terminal, the terminal update element 406 may transmit the order update to the order initiation element 403 via TBUS. The order initiation element 403 may then create an order ID for the order update and may assign the order ID to one or more of the terminals within the restaurant. Similarly, when an order update message received over the COMMS 402 requires processing of transactions outside of the terminals' capabilities (e.g., financial transactions with credit card providers, loyalty card discounts, merchant cash advance payments and holdback, etc.), the payment processor 404 may generate messages to complete the transactions and the messages are transmitted via COMMS 402. The payment processor 404 may further generate order updates (e.g., "order paid," "payment source 1 approved," "discount amount," "capital product approved," "MCA holdback rate changed," etc.) to be transmitted to the terminals and may provide these updates to the terminal update element 406 via TBUS. The terminal update element 406 may then provide those updates to the durable queue 411 via QBUS, and the updates are transmitted to the POS terminals in due course dependent upon connection status, as is described above.

The capital origination processor 420 retains a dataset of all historical POS data for all establishments that are current and former subscribers to a POS subscription service according to the present invention. The capital origination processor 420 may periodically analyze the historical POS data along with subscriber data, as will be described in more detail below, to determine establishments that meet criteria to proffer capital product offers. The capital origination processor 420 may also generate terms for capital products for each of the establishments that meet the criteria according to predicted probability of closure during a repayment period (hereinafter, "probability of default (PD)") and predicted revenue over the repayment period. The capital origination processor 420 may additionally automatically deduct regular payment amounts from processed credit card sales for each participating establishment and may vary holdback rates to account for variations in actual revenue versus predicted revenue. The capital origination processor 420 may moreover regularly update establishments that meet the criteria and their terms for cash advances based upon new POS and subscriber data, and may tender or retract capital product offers and generate engagement instructions for POS subscription service representatives based upon these updates.

The backend server 400 according to the present invention is configured to perform the functions and operations as discussed above. The server 400 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 400 may be shared with other circuits, microcode, etc., that are employed to perform other functions and/or operations within the server 400. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The backend server 400 may be embodied as one or more central processing units (CPUs) that are coupled to both transitory and non-transitory storage (i.e., memory), where one or more application programs that are configured to perform the server functions discussed above are stored in the non-transitory storage, transferred to the transitory storage at run time, and executed by the one or more CPUs.

Figure 5:
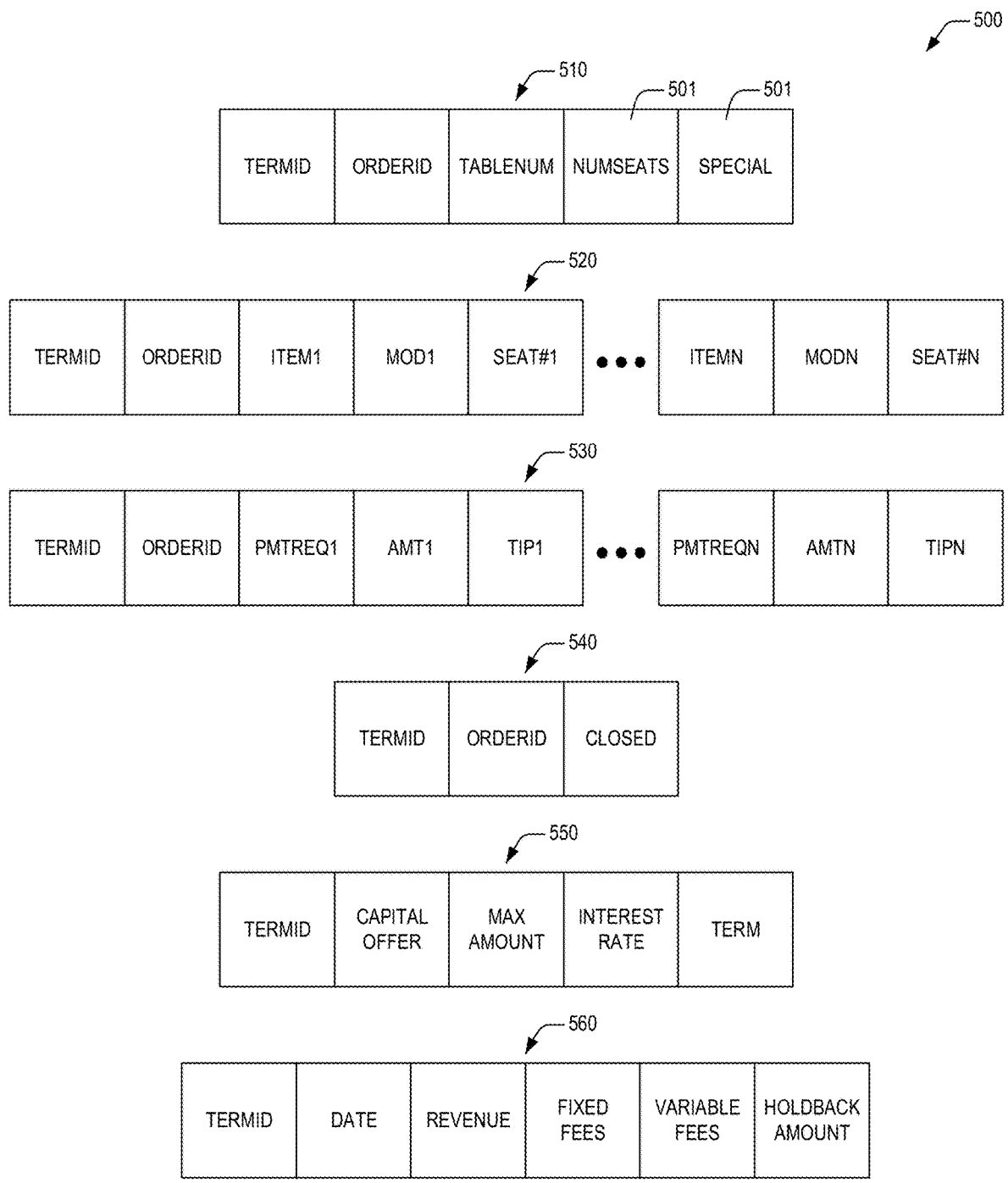
FIG. 5 is a block diagram illustrating exemplary update/status messages according to the present invention that are exchanged between a point-of-sale terminal and a backend server.

Now referring to FIG. 5, a block diagram is presented illustrating exemplary update/status messages 510, 520, 530, 540, 550, 560 according to the present invention that flow between a POS terminal and a backend server.

An order assignment message 510 transmitted by the server to one or more POS terminals may comprise fields 501 having a specific terminal ID TERMID assigned for a particular order ID ORDERID along with a table number TABLENUM having a given number of seats NUMSEATS. The message 510 may further comprise a SPECIAL field 501 via which special requirements (e.g., high chair, wheel chair access) are communicated to the POS terminal.

An order state change message 520 transmitted from a POS terminal to the server may comprise TERMID and ORDERID fields 501 as described above, along with one or more groups of ITEM, MOD, and SEAT# fields 501, where contents of the ITEM field 501 indicated a menu item ordered for a given seat number at the table along with any modifications to the item number (e.g., rare, no onions, etc.).

A payment state change message 530 transmitted from a POS terminal to the server may comprise TERMID and ORDERID fields along with one or more groups of PMTREQ, AMT, and TIP fields 501, where contents of the PMTREQ field 501 indicates a payment type (e.g., cash, MasterCard, etc.), and contents of AMT and TIP indicate amount of payment for the particular payment type along with a tip amount.

An order closeout message 540 may comprise TERMID and ORDER ID fields 501 as noted above, along with a CLOSED field 501, the contents of which indicate whether the particular order ID is open or closed.

A capital product offer message 550 exchanged between the backend server and a POS terminal operating in owner mode may comprise a TERMID field 501 as noted above along with a capital product offer announcement field, a maximum limit field MAX AMOUNT, an INTEREST RATE field designating an interest rate corresponding to the capital product offer, and a TERM field designating time period over which payments for the capital product offer, if accepted, will be held back from processed credit card transactions. In one embodiment, the payments are held back daily over the payback term. In one embodiment, the capital product many comprise a line of credit having an annual percentage rate and a term. In another embodiment, the capital product may comprise a fixed loan having a fixed fee over a particular term. In yet another embodiment, the capital product may comprise a merchant cash advance for a maximum amount at a specified interest rate over a fixed term. Other types of capital products are contemplated.

A sales and fees message 560 may comprise a TERMID field, a DATE field, a REVENUE field, a FIXED FEES field, a VARIABLE FEES field, and a HOLDBACK AMOUNT field. The TERM field may comprise a terminal ID associated with a POS terminal that is operating in an owner mode, as described above. The remaining fields may indicate POS revenue collected on a specified date, along with any fixed and variable fees assessed by the POS subscription service. For instance, the POS subscription service may charge a fixed monthly subscription fee and may furthermore charge a percentage of all credit card charges processed. The HOLDBACK AMOUNT field may indicate a dollar amount that the POS subscription service takes as a payment for the DATE for an originated capital product. Alternatively, the HOLDBACK AMOUNT field may indicate a percentage of credit card sales that the POS subscription service takes as a payment for the DATE associated with an originated capital product. Preferably the DATE is a single day of operations, though other periods for date are contemplated such as weekly and quarterly.

The messages 510, 520, 530, 540, 550, 560 are not exhaustive of those what may be employed according to the present disclosure but are provided herein to teach further aspects and advantages according to the present invention.

Figure 6:
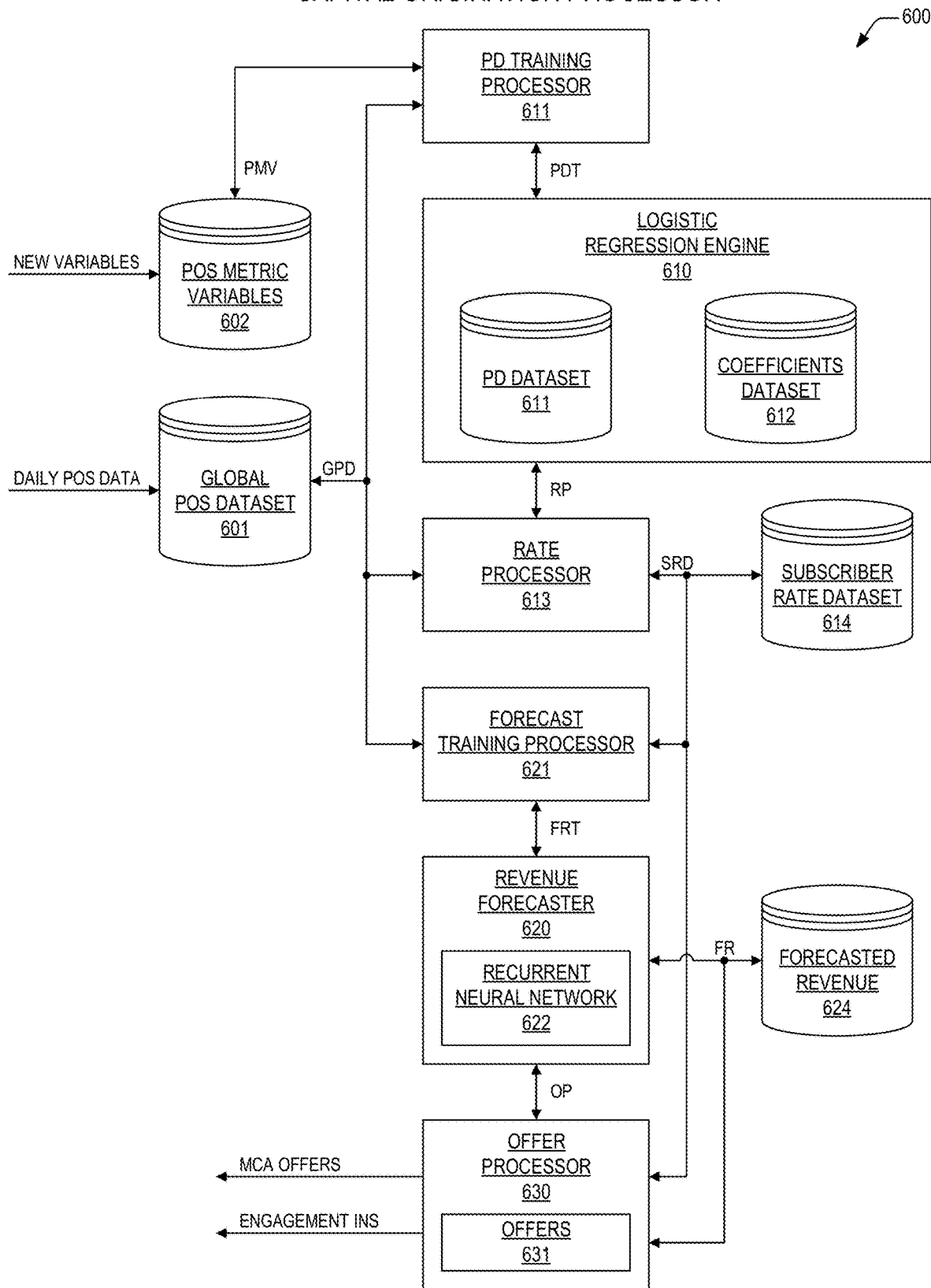
FIG. 6 is a block diagram detailing a capital origination processor according to the present invention.

Referring now to FIG. 6, a block diagram is presented detailing a capital origination processor 600 according to the present invention. The origination processor 600 may be disposed in a backend server, such as within server 400 of FIG. 4. The origination processor 600 may comprise a global POS dataset 601 that comprises POS subscription data corresponding POS records for all restaurants that participate in a POS subscription service according to the present invention, as is discussed above. In one embodiment, the number of restaurants participating in the service is greater than 1,000 restaurants that are dispersed throughout the nation, that have been in operation more than six months, that are of varying ownership structure (e.g., single-restaurant sole proprietors, partnerships, corporations, limited liability companies, trusts; multiple-restaurant sole proprietors, partnerships, corporations, limited liability companies, trusts), and that are of varying categories (e.g., quick- and full-service restaurants, food trucks, bars, cafes, pizza restaurants, hamburger restaurants, sushi restaurants, etc.). Preferably, the number of restaurants is greater than 10,000 with an operating history on the subscription service greater than two years.

The origination processor 600 may comprise a probability of default (PD) training processor 611 and a forecast training processor 621, both of which are coupled to the global POS dataset 601 via bus GPD. The PD training processor 611 is coupled to a POS metric variables dataset 602 via bus PMV and to a special purpose logistic regression engine 610 via bus PDT. The logistic regression engine 610 may comprise a PD dataset 611 and a coefficients dataset 612. The logistic regression engine 610 is coupled to a rate processor 612 via bus RP. The rate processor is also coupled to a subscriber rate dataset 614 via bus SRD and to the global POS dataset 601 via bus GPD.

The origination processor 600 may additionally comprise a revenue forecaster 620 that includes a special purpose recurrent neural network 622. The revenue forecaster 620 is coupled to the forecast training processor 621 via bus FRT, a forecasted revenue dataset 624 via bus FR and an offer processor 630 via bus OP. The offer processor 630 is also coupled to the subscriber rate dataset 614 via bus SRD and to the forecasted revenue dataset 624 via bus FR. The offer processor 630 may also include an offers dataset 631.

As noted above, the global POS dataset 601 comprises periodic subscriber POS sales data for all subscriber restaurants and additionally comprises an operating state (e.g., currently open along with date of subscription service initiation or permanently closed along with date of closure) for each of the restaurants. A backend server according to the present invention may regularly update the global POS dataset 602 with new subscriber POS data via bus TBUS (see FIG. 4), preferably daily.

In operation, the origination processor 600 is configured to regularly analyze and evaluate all currently open restaurants in the global POS dataset 601 against a set of statistical metrics that are stored in the POS metric variables dataset 602 to determine a probability that they will close permanently within a specified period. This probability is henceforth referred to as a probability of default (PD). In one embodiment, the specified period is 270 days. In another embodiment, the specified period is 180 days. A further embodiment contemplates a period of 365 days. Other specified periods are envisioned as well. In one embodiment, the set of statistical metrics may comprise greater than 20 metrics that include but are not limited to: total revenue generated while on the subscription server, total yearly revenue, short term revenue for a shorter specified period divided by revenue over the specified period, standard deviation of tips over the specified period, standard deviation of tips over the period on the subscription server, average ticket size over the specified period, average ticket size over the period on the subscription service, tax rate etc. As will be described below, the POS subscriber service may add new metric variables and delete existing metric variables via bus TBUS, thus providing for calibration of the system. Preferably, the origination processor 600 generates a PD for each of the currently open restaurants daily. Another embodiment contemplates weekly generation of PDs.

The metrics in the POS metric variables dataset 602 are employed by the PD training processor 611 to generate metric variable values for all restaurants within the global dataset 601 for each day of historical operation, where only those restaurants that have been on the subscription service greater than a prescribed period are processed. In one embodiment, the prescribed time period is six months, though other period values are contemplated. The metric variable values for each date, along with restaurant identifier, category, season for the data (e.g., week of the year), and ownership structure are stored in the PD dataset 611 as predictor variables and open/closed status of the restaurants are stored as outcome variables corresponding to the predictor variables. The rows of the PD dataset 611 are then down sampled to reduce the size of the dataset 611 and to represent a number of currently open restaurants that are roughly equal to the number closed restaurants. In one embodiment metric variable values for each date of POS data for each open restaurant are chosen randomly and metric variable values for each date of POS data for each closed restaurant are chosen randomly.

The logistic regression engine 610 performs a binary logistic regression on the PD dataset 611 to generate and store a set of regression coefficients in the coefficients dataset 612 that indicate the size and direction of a relationship between the predictor variables and the outcome variable. The coefficients are subsequently employed by the logistic regression engine 610 in a logistic regression equation to generate PDs for each of the currently open restaurants in the global POS dataset 601, and the generated PDs are provided to the rate processor 613 via bus RP. It is beyond the scope of the present application to provide an in-depth discussion of logistic regression and various enhanced techniques applied thereto, for these techniques are well known to those skilled in the art. It is sufficient for purposes of disclosing the present invention to note that logistic regression is applied to determine PDs for each currently open restaurant in the subscriber POS dataset 601 and these PDs are further utilized, as will be described in further detail below, to accurately size and price capital product offers to those restaurants that qualify.

Preferably, the logistic regression engine 610 according to the present invention is configured to perform binary logistic regression using a regression analysis method that performs variable selection (also known as "feature selection," "variable subset selection"). This method is referred to as relaxed least absolute shrinkage and selection operator (LASSO), or relaxed LASSO. As one skilled in the art will appreciate, such a technique, relaxed LASSO selects a subset of relevant variables for use that advantageously simplifies the logistic regression analysis and results in shorter training time because redundant and/or irrelevant variables are eliminated without sacrificing significant accuracy. Relaxed LASSO essentially makes two passes: a first LASSO to downsize a complete set of variables to a lesser number of variables, and a second LASSO pass operates on the lesser number of variables to further eliminate variables, thus ensuring that an optimum and manageable set of metric variables is yielded for the logistic regression engine 610 to generate the logistic regression coefficients for calculating PD, which are stored in the coefficients dataset 612. In other words, the PD training processor 611 employs historical POS subscriber data for all restaurants in the subscriber system, both those that are currently operating and those that have closed, including statistical metrics of POS data leading up to closure, to generate a set of regression coefficients that may be employed when looking at a restaurant's more recent POS data stream to indicate with as a probability whether the restaurant will stay open or whether it will close. In one embodiment, the coefficients are employed to calculate a PD within a following period of time, preferably 270 days, though other periods of time are contemplated.

Once the logistic regression engine 610 is trained, the origination processor 600 passes control to the rate processor 613. Accordingly, the rate processor 613 accesses POS subscriber data stored in the global POS dataset 601 for all currently open restaurants over a previous period of time that is equal to that required for payback of disbursed capital to determine a PD for each currently open restaurant within a payback period of time. As discussed above, the present inventors have preferred a payback period of 270 days but note that such a period was chosen solely based on business-related constraints, and that other embodiments may be easily adapted to comport with different payback periods.

The rate processor 613 then generates a PD dataset 611 for the open restaurants that comprises daily values of the reduced set of metrics yielded from employing relaxed LASSO. The rate processor 613 then directs the logistic regression engine to generate PDs for each of the open restaurants using the coefficients stored in the coefficient dataset 612. These PDs are provided to the rate processor 613 via bus RP.

The rate processor 613 then performs a linear calculation, based on business-related constraints, using the PDs as a variable to generate an interest rate (e.g., APR, fixed fee, variable interest rate, discount, etc.) associated with a potential capital product offer for each of the currently open restaurants. In one embodiment, those restaurants showing a generated interest rate greater than 30 percent are excluded and those showing a generated interest rate less than 15 percent are set to an offer rate of 15 percent. The base and slope coefficient for the linear calculation equation are set based on business-related constraints to result in a substantial percentage of currently open restaurants receiving an offer. In one embodiment, the percentage value is 60 percent of open restaurants, though other values are contemplated. Upon elimination of high-risk restaurants and generation of interest rates for offer, the interest rates, PDs, and payback term are stored in the subscriber rate dataset 614. Once the interest rates are set, the origination processor 600 then turns to determining a maximum loan amount for each of the restaurants in the subscriber rate dataset 614.

Accordingly, control is passed to the forecast training processor 621. Accordingly, in one embodiment, the forecast training processor 621 accesses the global POS dataset 601 to retrieve historical POS data associated with all subscriber restaurants for a period of time that is twice the duration of the specified period, where an oldest first half of the historical POS data is used as inputs to train the recurrent neural network 622 and the youngest second half of the historical POS data is used to train outputs of the recurrent neural network 622. In one embodiment the specified period is 270 days, so 540 days of historical POS data is retrieved to train the neural network 622. Another embodiment contemplates a specified period of 360 days, so 720 days of historical data is retrieved to train the neural network 622. Other durations of the specified period are contemplated as well. In addition to retrieving the historical POS data, a stream of comprising the time of year (e.g., week of year, season, etc.) and zip codes may be included as inputs to a dense layer of the neural network 622. Other additional data streams are contemplated to train the neural network 622 such as tips, taxes, number of guests, and other available POS data. Restaurant category (e.g. type) and metropolitan statistical area may also be employed, thereby enabling the recurrent neural network 622 to learn about typical seasonal patterns that different restaurants in different geographies experience. The data is then provided via bus FRT to the revenue forecaster 620, which is employed to train the recurrent neural network 622 to estimate a future stream of POS revenue for a restaurant, where the estimated future stream is equal in time to the prescribed payback period. In other words, the recurrent neural network 622 is trained to estimate a future stream of POS revenue for a restaurant as a function of its immediately preceding stream, by training the recurrent neural network 622 using all historical POS streams and optional additional data such as location identifiers (e.g., zip codes), restaurant category, time of year indications, and restaurant category corresponding to both currently open and closed restaurants. The present inventors note that the preferable configuration of the neural network 622 is as a recurrent neural network 622, that uses long short term memory units, but a recurrent neural network 622 that uses gated recurrent units is also contemplated.

Following training, the forecast training processor 621 then accesses the subscriber rate dataset 614 to retrieve those restaurants that have been selected for capital product offers by the rate processor 613. The forecast training processor 621 then accesses the global POS dataset 601 and retrieves the location identifiers and POS data for an immediately preceding period of time that is equal to the prescribed payback period only for those restaurants selected for the capital product offers and provides this location and POS data to the revenue forecaster 620 via bus FRT. The trained neural network 622 then generates a POS revenue stream for each of the selected restaurants using the parameters that were optimized during training. Advantageously, the neural network 622 according to the present invention is trained so that it is informed by each restaurant's location, thereby allowing for similarities in location (e.g., urban, remote, tourist area, etc.) to influence generation of predicted POS revenue streams. In one embodiment, the POS revenue stream is a daily POS revenue stream for a number of days including in the payback period. For a payback period of 270 days, a daily POS revenue stream will have 270 daily POS revenue amounts. These POS revenue streams are then stored in the forecasted revenue dataset 624 along with a total revenue amount for each of the POS revenue streams. Control is then passed to the offer processor 630.

The offer processor 630 accesses the subscriber rate dataset 614 to retrieve interest rates corresponding to restaurants selected for capital product offers and accesses the forecasted revenue dataset 624 to retrieve total revenue for each of the selected restaurants. The offer processor 630 calculates fixed percentage of each selected restaurant's total revenue over the payback period as a maximum amount for a capital product offer. This maximum amount along with a corresponding interest rate (e.g., APR, fixed fee, fixed or variable interest rate, discount, etc.) for each selected restaurant are then stored in an offer table 631. It is noted that the fixed percentage is set according to business-related constraints. In one embodiment, the fixed percentage is set to five percent of total predicted revenue over the payback period, and the fixed percentage may range between a minimum of $10,000 and a maximum of $250,000.

The offer processor 630 may access the offers 631 and contact those selected restaurants via messages from the backend server (via TBUS and MSG) to a POS terminal in the restaurants operating in an owner configuration. Alternatively, the offer processor 630 may contact those selected restaurants via email, regular mail, telephone, or in-person. Accordingly, the restaurant owners are tendered an offer for capital having a maximum loan amount, a fixed payback term, and an interest rate as described above. In one embodiment, the selected restaurants are allowed 1-3 days to accept the offer and specify an amount of capital to be disburse that does not exceed the maximum offer amount. If a given restaurant elects to participate, the offer processor 630 then instructs the payment processor (via TBUS) to originate (i.e., disburse) the specified amount to the restaurant, and to begin periodic holdbacks of the restaurant's processed credit card sales at a holdback rate with provides for fixed periodic payments over the payback period which will pay off the accessed capital including interest. In one embodiment, the holdbacks are processed daily, and the holdback rate is adjusted to hold back the daily payment based on processed credit card sales only. For example, for a restaurant that has a lower volume of credit card sales compared to cash sales, the holdback rate will be higher than the daily interest rate. For a restaurant that has very high credit card sales relative to cash sales, the holdback rate will be very close to the daily interest rate.

The origination processor 600 may furthermore update all of the datasets 601-602, 611-12, 614, 624 to update PDs, potential interest rates, and forecasted revenues based upon more recent POS data. In one embodiment, the origination processor 600 performs these updates on a weekly basis.

The offer processor 630 is also configured to compare actual revenue to forecasted revenue and updated PDs with previous PDs and to automatically generate engagement instructions for participating restaurants whose PD has increased by more than a threshold amount and/or whose total predicted revenue falls by a specified percentage below a previously predicted revenue. In one embodiment, the threshold amount comprises an increase of 10 percent over a previous PD and the specified percentage comprises a reduction in predicted revenue of 20 percent compared to a previous predicted revenue. Advantageously, subscription service field representatives are automatically alerted to service restaurant subscribers that more at risk for repayment.

In another embodiment, the offer processor 630 may be configured to withdraw offers to one or more selected restaurants that have yet to elect to participate in capital product offers, where the withdrawals are based upon increased PDs and/or decreased POS revenue. In one embodiment, offers are withdrawn for those restaurants whose PD has increased such that calculation of their corresponding offer interest rates rises above an upper rate limit. In one embodiment, the upper rate limit is 30 percent. In another embodiment, interest rates offered may decrease upon decrease of PD as described above down to a lower rate limit. In one embodiment, the lower rate limit is 15 percent.

In a further embodiment, the offer processor 630 may be configured to increase or decrease the maximum offer amount based upon updated predicted total revenues.

To summarize, the present invention provides a superior technical solution to a technical problem, namely how to dynamically underwrite and automatically provide a capital product offer for a participating subscriber in a timely manner without requiring an owner to generate all of the documentation that present-day capital sources use to underwrite loans, and how to automatically hold back payments for a disbursed amount without requiring owner-initiated actions. Advantageously, the present invention provides these summarized functions, and others, by using only subscriber POS data as a proxy for repayment risk, thus enabling many SMBs in the industry that do not have access to conventional capital to manage that grow their businesses. POS data is employed according to the present invention to determine interest rates (e.g., cost of capital) and is further employed to project revenue in order to determine offer caps. The origination processor 600 according to the present invention provides for a remarkable improvement in the industry by eliminating conventional underwriting documentation requirements, automating recovery of capital, and automating alerts. Accordingly, the present invention provides for a "virtual credit score" for any subscriber restaurant that is derived exclusively from the subscriber restaurant's POS data.

Additionally, the techniques according to the present invention are advantageous over present-day finance techniques because establishments are evaluated relative to other like establishments in their industry, namely, establishments within the same or similar category, that have the same ownership structure, that within the same or similar locations, and that have similar seasonal revenue streams.

The origination processor 600 according to the present invention is configured to perform the functions and operations as discussed above. The origination processor 600 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the origination processor 600 may be shared with other circuits, microcode, etc., that are employed to perform other functions and/or operations within the origination processor 600. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

The origination processor 600 may be embodied as one or more central processing units (CPUs) that are coupled to both transitory and non-transitory storage (i.e., memory), where one or more application programs that are configured to perform the server functions discussed above are stored in the non-transitory storage, transferred to the transitory storage at run time, and executed by the one or more CPUs.

It is noted that derivation of PDs, interest rates, maximum MCA amounts, and automation of timely MCA offers and payments cannot be practically performed in the human mind, at least because performing such functions requires a access to hundreds of thousands of POS data records and processing of these records to generate dynamically changing PDs and forecasted revenue streams, thus providing a vast improvement in the art over that which has heretofore been provided.

Figure 7:
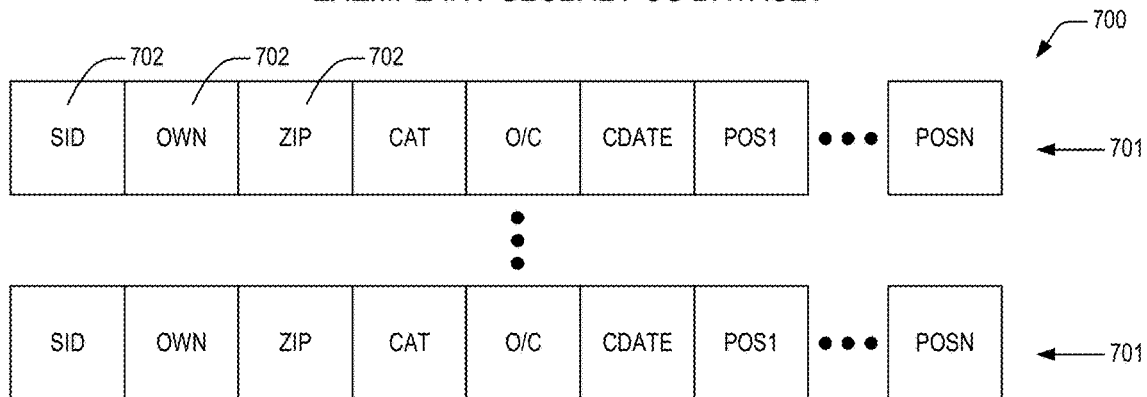
FIG. 7 is a block diagram illustrating an exemplary global point-of-sale dataset according to the present invention.

Now turning to FIG. 7, a block diagram is presented illustrating an exemplary global point-of-sale dataset 700 according to the present invention, substantially similar to the dataset 601 of FIG. 6. The dataset 700 may comprise a plurality of entries 701 (i.e., records 700) each associated with a corresponding subscriber restaurant. Each entry 701 may comprise a plurality of fields 702 that include: SID, that contains a unique subscriber ID identifying the restaurant; OWN, contents of which indicate an ownership structure as described above for the restaurant; ZIP, contents of which indicate a location of the restaurant (zip code in the U.S., analogous locator codes outside of the U.S.); CAT, contents of which indicate a restaurant category as discussed above for the restaurant; O/C, contents of which indicate whether restaurant is currently operating or permanently closed; CDATE, contents of which designate a date of closure for permanently closed restaurants; and POS1-POSN, contents of which indicate a date and periodic POS revenue for the date. In a daily update embodiment, a restaurant that has been open two years will have about 730 POS fields, each comprising a different date, a season of the year, and total POS revenue (i.e., cash and credit card sales) for the different dates. In a weekly update embodiment, a restaurant that has been open two years will have about 104 POS fields, each comprising a different week, a season of the year, and total POS revenue (i.e., cash and credit card sales) for the different weeks. In one embodiment, the season of the year may comprise week of the year (e.g., week 2, week 24, etc.). In another embodiment, the season of the year may comprise first quarter, second quarter, third quarter, or fourth quarter. As discussed above with reference to FIG. 6, contents of these POS records 701 are employed to predict a PD for each unique subscriber restaurant over a prescribed payback term and, for those restaurants having PDs under a specified threshold, the contents are employed to predict future POS revenue over the payback period.

Figure 8:
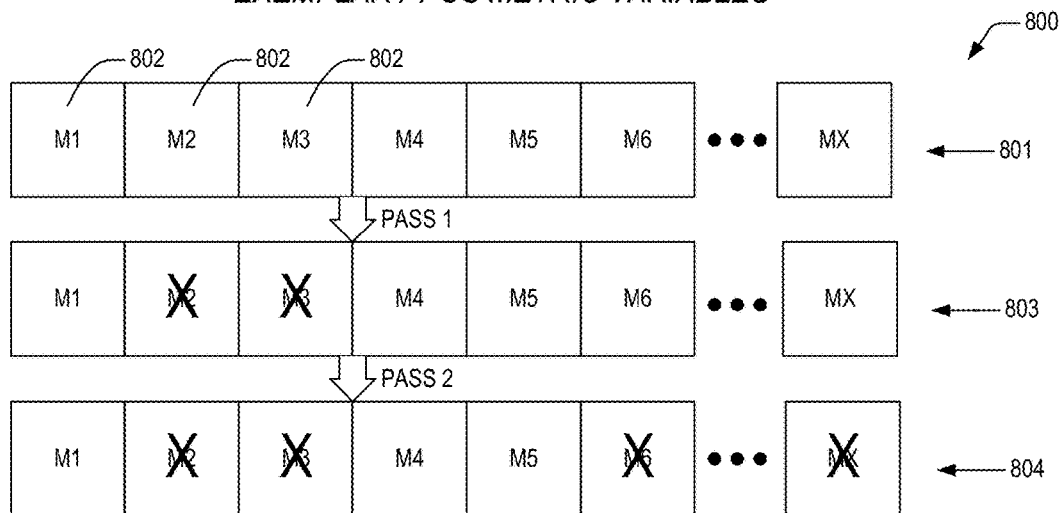
FIG. 8 is a block diagram depicting exemplary point-of-sale metric variables according to the present invention.

Referring now to FIG. 8, a block diagram is presented depicting exemplary point-of-sale metric variables 800 according to the present invention, such as may be stored in the POS metric variables dataset 602 and that are eliminated by the relaxed LASSO logistic regression engine 610 of FIG. 6. The engine 610 may further store a complete set of the POS metric variables along with a subset of the POS metric variables that remain following two-pass elimination of redundant and/or irrelevant variables. A set 801 of X statistical metric variables M1-MX, as discussed above, are shown as initially fetched from the POS metric variables dataset 602. After a first LASSO pass, exemplary variables M2-M3 are eliminated yielding a first subset 803. After a second LASSO pass, the engine 610 further eliminates variables M6 and MX, yielding a remaining subset 804 of variables, which are employed by the logistic regression engine 610 to generate regression coefficients that are employed to generate PDs for restaurants based on their individual metric values. It is noted that the logistic regression engine 610 may also treat subscriber data accessed from the global POS dataset 601 (e.g., CAT, OWN, etc.) as additional metric variables, one or more of which may be eliminated as being redundant or irrelevant. In this manner the addition of subscriber data accessed from the global POS dataset 601 as predictor variables informs the logistic regression to enable restaurants to be compared to like restaurants when determining their PDs.

Figure 9:
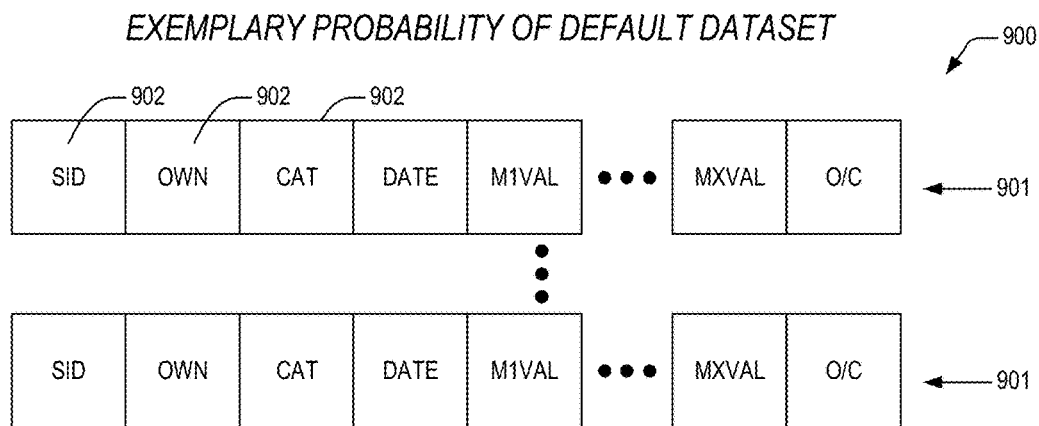
FIG. 9 is a block diagram featuring an exemplary probability of default dataset according to the present invention.

FIG. 9 is a block diagram featuring an exemplary probability of default dataset 900 according to the present invention. The dataset 900 may comprise a plurality of records 901, each associated with a corresponding subscriber restaurant. Each entry 901 may comprise a plurality of fields 902 that include: SID, that contains a unique subscriber ID identifying a corresponding restaurant; OWN, contents of which indicate an ownership structure as described above for the restaurant; ZIP, contents of which indicate a location of the restaurant (zip code in the U.S., analogous locator codes outside of the U.S.); CAT, contents of which indicate a restaurant category as discussed above for the restaurant; DATE, contents of which indicate a date and season of year associated with the record 901; M1VAL-MXVAL, contents of which indicate a value calculated using POS data for a given metric variable M1-MX, as discussed above with reference to FIG. 8; and O/C, contents of which indicate if the restaurant was currently open or permanently closed as of the contents of DATE. For a first pass of the regression engine 610, values are calculated for all metric variables M1-MX in the POS metric variables dataset 602. For the second pass of the regression engine 610, values are calculated only for the first subset 803. For coefficient generation and for subsequent PD calculations using the generated coefficients, values are calculated only for the remaining subset 804. Though shown in all of the records 901, it is noted that the first or second passes of the logistic regression may eliminate one or more of OWN or CAT.

Figure 10:
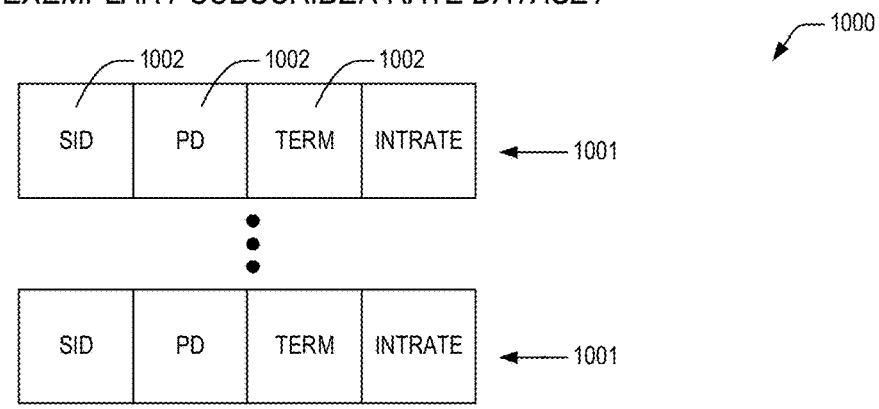
FIG. 10 is a block diagram showing an exemplary subscriber rate dataset according to the present invention.

FIG. 10 is a block diagram showing an exemplary subscriber rate dataset 1000 according to the present invention such as may be stored in the subscriber rate dataset 614 of FIG. 6. The dataset 1000 comprises a plurality of records 1001, each associated with a corresponding currently operating restaurant in the POS subscriber system. Each record 1001 may comprise the following fields 1002: SID—unique identifier for a subscriber restaurant; PD—probability of default (i.e., permanent closure) in a following specified payback period; TERM—duration of the payback period (e.g., 270 days); and INTRATE—calculated interest rate (e.g., APR, fixed or variable interest rate, fixed loan cost, discount for a merchant cash advance, etc.) for a specific capital product. As noted above, for business-related purposes, the system according to the present invention preferably does not extend capital product offers to restaurants having a calculated interest rate greater than 30 percent and sets offer interest rates to 15 percent for those restaurants having a calculated interest rate less than 15 percent.

Figure 11:
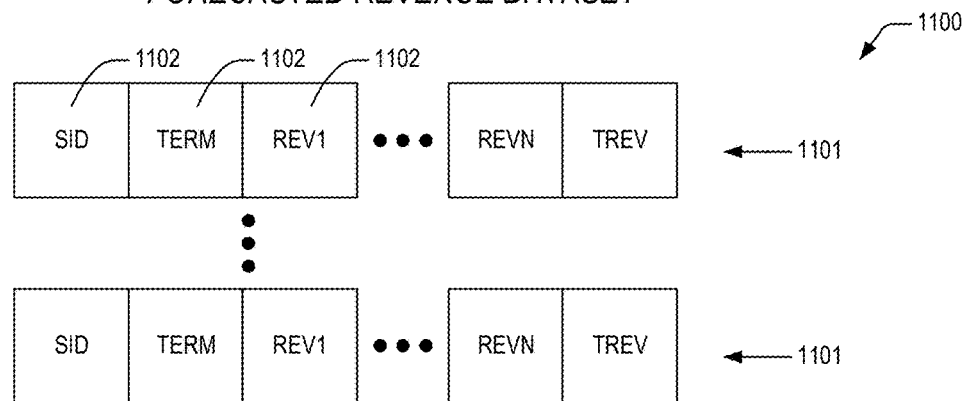
FIG. 11 is a block diagram illustrating an exemplary forecasted revenue dataset according to the present invention.

Now turning to FIG. 11, a block diagram is presented illustrating an exemplary forecasted revenue dataset 1100 according to the present invention such as may be generated by the revenue forecaster 620 and employed by the offer processor 630 of FIG. 6. The dataset 1100 may comprise a plurality of records 1101, each associated with a corresponding currently operating restaurant in the POS subscriber system. Each record 1101 may comprise the following fields 1102: SID—unique identifier for a subscriber restaurant; TERM—duration of the payback period, also duration of a corresponding daily revenue forecast (e.g., 270 days); REV1-REVN-predicted daily revenue, both cash and credit sales, for the corresponding currently operating restaurant; and TREV—total revenue over TERM (i.e., the sum of REV1-REVN values).

Figure 12:
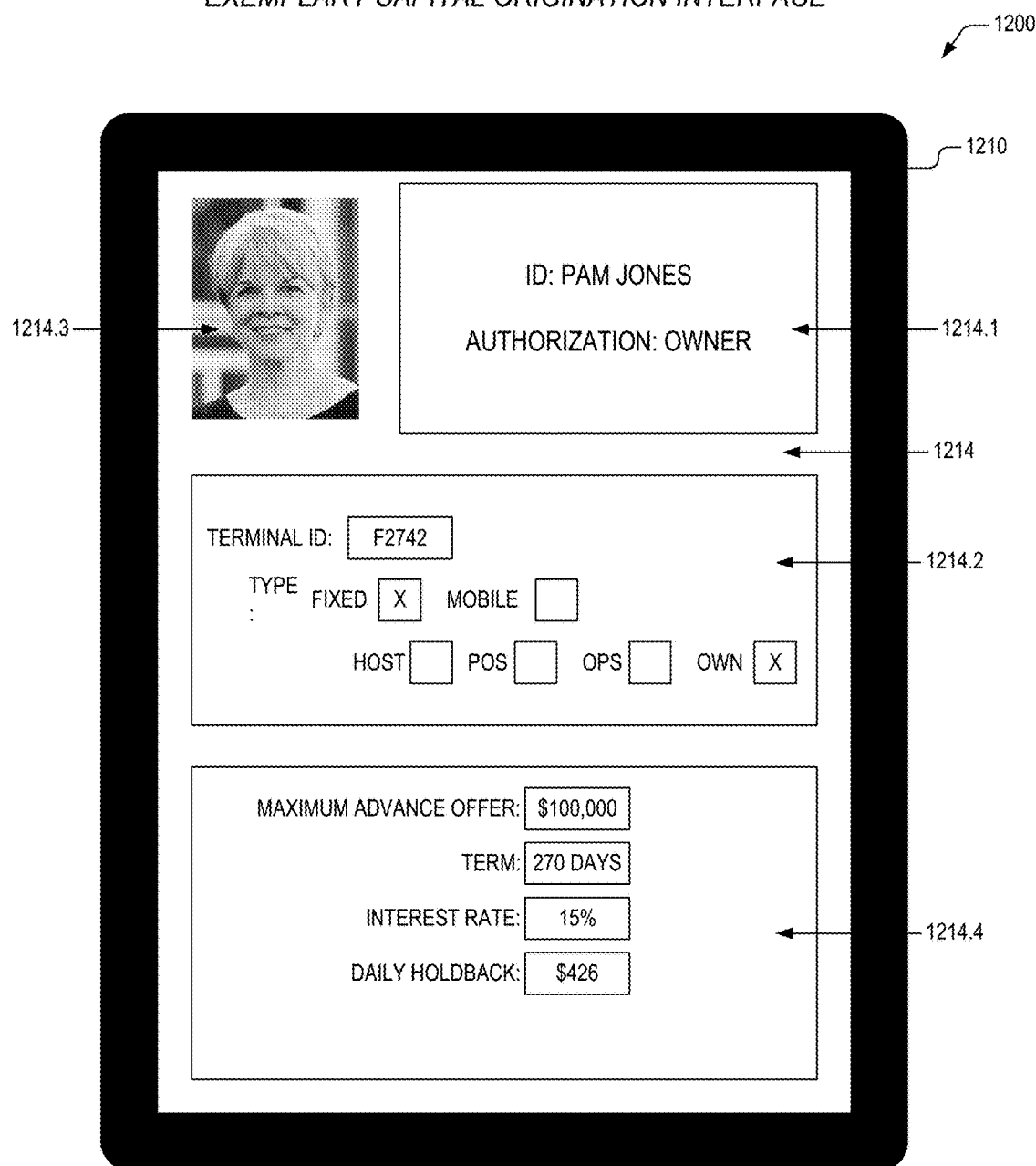
FIG. 12 is a diagram detailing an exemplary capital origination interface shown on a point-of sale terminal according to the present invention.

Finally referring to FIG. 12, a diagram 1200 is presented detailing an exemplary capital origination interface shown on a POS terminal 1210 according to the present invention that is operating in an owner mode as described above. The POS terminal 1210 may comprise a touchscreen display 1214. The terminal 1210 may be employed either by an owner of the restaurant to perform management functions, to view sales and related metrics, to arrange for access to capital, and other management-related owner function. Dimensions of the terminal 1210 may vary according to configuration. For example, when configured as a handheld wireless terminal 1210, the terminal 610 may comprise an approximately 8-inch Android tablet computer. When configured as a fixed terminal 1210, the terminal 1210 may comprise a 15- or 22-inch tablet as described above, connected to the system either via a wired or wireless link. Other dimensions of the terminal 610 are contemplated.

The touchscreen display 1214 may comprise an owner identification area 1214.1, an owner photo area 1214.3, a terminal configuration area 1214.2, and a capital product offer area 1214.4. As the diagram 1200 shows, owner PAM JONES is using the terminal 1210. The terminal configuration area 1214.2 show a unique terminal identifier, F2742, and further shows the terminal as a fixed terminal operating in an owner mode. The capital product offer area 1214.4 shows an exemplary merchant cash advance offer to the owner having a maximum advance amount of $100,000 at 15 percent interest with a payback term of 270 days. Thus, an MCA of $100,000 will cost the owner $115,000 over the payback period, and thus the capital product offer area 1214.4 shows a daily holdback amount of $426. As is noted above, daily payments are taken from credit card sales only, which may result in a credit sales holdback rater that is greater than the 15 percent interest rate shown.

Although the present invention has been described above in the context of a restaurant POS system where the capital origination processor of FIG. 6 is disposed within a backend server (see FIG. 4), the present inventors note that aspect of the present invention contemplate stand-alone embodiments. That is, the capital origination processor may be disposed separately from the backend server, and may function independently to generate capital product offers subscribers to another POS subscription service, where the capital origination processor may access POS subscription service data, as that shown in the global POS dataset 601 of FIG. 6, and perform the above-noted functions to generate the capital product offers, and where the offers may be transmitted electronically, transmitted by mail, or delivered in person.

Portions of the present invention and corresponding detailed description are presented in terms of software or algorithms, and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

The invention claimed is:

1. A system for automated origination of capital client engagement, the system comprising:

a payment processor, configured to process credit card transactions for subscribers of a point-of-sale (POS) subscription service; and a capital origination processor, comprising:

a logistic regression engine, configured to perform a binary logistic regression on subscriber data and metrics that are derived exclusively from historical POS data corresponding to all of said subscribers to generate logistic regression coefficients that are used to calculate probability of default (PD) values for each of said subscribers, and configured to employ new subscriber data and metrics that are derived exclusively from new POS data to generate updated PD values for said each of said subscribers;

a revenue forecaster, coupled to said rate processor, configured to exclusively employ said historical POS data to predict future POS data for establishments corresponding to said each of said subscribers, and to exclusively employ said future POS data to generate predicted total revenues corresponding to said each of said subscribers over a payback period, and configured to exclusively employ new POS data to generate updated predicted total revenues corresponding to said each of said subscribers, said revenue forecaster comprising:

a recurrent neural network that is trained on an older first half of said historical POS data to predict a younger second half of said historical POS data, and that is executed using said younger second half of said historical POS data to generate said future POS data; and an offer processor, configured to compare said updated predicted total revenues with said predicted total revenues and said updated PD values with said PD values, and configured to automatically generate and transmit engagement instructions over the internet cloud to representatives for establishments that have received a capital product offer and whose updated PD has increased by more than a threshold amount over said PD, and configured to direct said payment processor to retain holdback amounts of processed credit card transactions at corresponding holdback rates for each of said subscribers that have accepted disbursements of said capital product offers, and configured to direct said payment processor to vary said corresponding holdback rates and holdback amounts based exclusively on said processed credit card transactions.

2. The system as recited in claim 1, wherein said logistic regression engine, said revenue forecaster, and said offer processor are disposed within a backend server that is coupled via the internet to a plurality of fixed and mobile terminals in establishments corresponding to said each of said subscribers, and wherein said subscribers employ said plurality of fixed and mobile terminals in conjunction with said backend server to initiate and process orders within said establishments, and to take payments for said orders, wherein said payments comprise processing of credit card transactions.

3. The system as recited in claim 2, wherein said backend server takes payments for accepted capital product offers by automatically deducting said holdback amounts from said processed credit card sales transactions, and wherein said capital origination processor varies said holdback rates and said holdback amounts to account for variations in actual revenue versus predicted revenue for each of said subscribers that have accepted said disbursements of said capital product offers.

4. The system as recited in claim 3, wherein said holdback amounts are deducted daily.

5. The system as recited in claim 1, wherein said offer processor is also configured to automatically generate and transmit said engagement instructions for said establishments whose updated predicted total revenue falls by a specified percentage below a previously predicted total revenue.

6. The system as recited in claim 5, wherein said threshold amount comprises an increase of 10 percent over a previous PD and said specified percentage comprises a reduction in predicted total revenue of 20 percent compared to a previous predicted total revenue.

7. The system as recited in claim 1, wherein said revenue forecaster comprises a recurrent neural network that is trained on said historical POS data corresponding to said each of said subscribers, and that processes a subset of said historical POS data to predict said future POS data, wherein a length of said subset corresponds to said payback period.

8. A system for automated origination of capital client engagement, the system comprising:
   a payment processor, configured to process credit card transactions for subscribers of a point-of-sale (POS) subscription service; and
   a capital origination processor, comprising:
      a logistic regression engine, configured to perform a binary logistic regression on subscriber data and metrics that are derived exclusively from historical POS data corresponding to all of said subscribers to generate logistic regression coefficients that are used to calculate probability of default (PD) values for each of said subscribers, and configured to employ new subscriber data and metrics that are derived exclusively from new POS data to generate updated PD values for said each of said subscribers;
      a revenue forecaster, coupled to said rate processor, configured to exclusively employ said historical POS data to predict future POS data for restaurants corresponding to said each of said subscribers, and to exclusively employ said future POS data to generate predicted total revenues corresponding to said each of said subscribers over a payback period, and configured to employ new POS data to generate updated predicted total revenues corresponding to said each of said subscribers, said revenue forecaster comprising:
         a recurrent neural network that is trained on an older first half of said historical POS data to predict a younger second half of said historical POS data, and that is executed using said younger second half of said historical POS data to generate said future POS data; and
      an offer processor, configured to compare said updated predicted total revenues with said predicted total revenues and said updated PD values with said PD values, and configured to automatically generate and transmit engagement instructions over the internet cloud to representatives for restaurants that have received a capital product offer and whose updated PD has increased by more than a threshold over said PD, and configured to direct said payment processor to retain holdback amounts of processed credit card transactions at corresponding holdback rates for each of said subscribers that have accepted disbursements of said capital product offers, and configured to direct said payment processor to vary said corresponding holdback rates and holdback amounts based exclusively on said processed credit card transactions.

9. The system as recited in claim 8, wherein said logistic regression engine, said revenue forecaster, and said offer processor are disposed within a backend server that is coupled via the internet to a plurality of fixed and mobile terminals in restaurants corresponding to said each of said subscribers, and wherein said subscribers employ said plurality of fixed and mobile terminals in conjunction with said backend server to initiate and process orders within said restaurants, and to take payments for said orders, wherein said payments comprise processing of credit card transactions.

10. The system as recited in claim 9, wherein said backend server takes payments for accepted capital product offers by automatically deducting said holdback amounts from said processed credit card sales transactions, and wherein said capital origination processor varies said holdback rates and said holdback amounts to account for variations in actual revenue versus predicted revenue for each of said subscribers that have accepted said disbursements of said capital product offers.

11. The system as recited in claim 10, wherein said holdback amounts are deducted daily.

12. The system as recited in claim 8, wherein said offer processor is also configured to automatically generate and transmit said engagement instructions for said establishments whose updated predicted total revenue falls by a specified percentage below a previously predicted total revenue.

13. The system as recited in claim 12, wherein said threshold amount comprises an increase of 10 percent over a previous PD and said specified percentage comprises a reduction in predicted total revenue of 20 percent compared to a previous predicted total revenue.

14. A method for automated origination of capital client engagement, the method comprising:
   processing credit card transactions for subscribers of a point-of-sale (POS) subscription service;
   performing a binary logistic regression on subscriber data and metrics that are derived exclusively from historical POS data corresponding to all of said subscribers to generate logistic regression coefficients that are used to calculate probability of default (PD) values for each of the subscribers, and employing new subscriber data and metrics that are derived exclusively from new POS data to generate updated PD values for the each of the subscribers;
   exclusively employing the historical POS data to predict future POS data for establishments corresponding to the each of the subscribers, and using the future POS data to generate predicted total revenues corresponding to the each of the subscribers over a payback period, and exclusively employing new POS data to generate updated predicted total revenues corresponding to the each of the subscribers, wherein said exclusively employing comprises:
      training a recurrent neural network using an older first half of said historical POS data to predict a younger second half of said historical POS data; and
      executing the trained recurrent neural network using the younger second half of said historical POS data to predict the future POS data;

comparing the updated predicted total revenues with the predicted total revenues and the updated PD values with the PD values, and automatically generating and transmitting engagement instructions over the internet cloud to representatives for establishments that have received a capital product offer and whose updated PD has increased by more than a threshold amount over the PD; and retaining holdback amounts of processed credit card transactions at corresponding holdback rates for each of the subscribers that have accepted disbursements of the capital product offers, varying the corresponding holdback rates and holdback amounts based exclusively on the processed credit card transactions.

15. The method as recited in claim 14, wherein the method is performed by one or more special-purpose central processing units disposed within a backend server that is coupled via the internet to a plurality of fixed and mobile terminals in establishments corresponding to the each of the subscribers, and wherein the subscribers employ the plurality of fixed and mobile terminals in conjunction with the backend server to initiate and process orders within the establishments, and to take payments for the orders, wherein the payments comprise processing of credit card transactions.

16. The method as recited in claim 15, wherein the backend server takes payments for accepted capital product offers by automatically deducting the holdback amounts from the processed credit card sales transactions, and varies the holdback rates and the holdback amounts to account for variations in actual revenue versus predicted revenue for each of the subscribers that have accepted the disbursements of the capital product offers.

17. The method as recited in claim 16, wherein the holdback amounts are deducted daily.

18. The method as recited in claim 14, further comprising:
automatically generating and transmitting the engagement instructions for the establishments whose updated predicted total revenue falls by a specified percentage below a previously predicted total revenue.

19. The method as recited in claim 18, wherein the threshold amount comprises an increase of 10 percent over a previous PD and the specified percentage comprises a reduction in predicted total revenue of 20 percent compared to a previous predicted total revenue.

20. The method as recited in claim 14, wherein said employing the historical POS data to predict future POS data corresponding to the each of the subscribers comprises utilizing a recurrent neural network that is trained on the historical POS data corresponding to the each of the subscribers, and that processes a subset of the historical POS data to predict the future POS data, wherein a length of the subset corresponds to the payback period.

* * * * *